US011538055B2

(12) United States Patent
Tietzen et al.

(10) Patent No.: US 11,538,055 B2
(45) Date of Patent: Dec. 27, 2022

(54) SYSTEMS AND METHOD FOR INCENTING CONSUMERS

(71) Applicant: Edatanetworks Inc., Edmonton, CA (US)

(72) Inventors: Terrance Patrick Tietzen, Edmonton (CA); Matthew Arnold Macpherson Bates, Beaumont (CA)

(73) Assignee: EDATANETWORKS INC., Calgary (CA)

( * ) Notice: Subject to any disclaimer, the term of this patent is extended or adjusted under 35 U.S.C. 154(b) by 168 days.

(21) Appl. No.: 14/408,199

(22) PCT Filed: Jun. 14, 2013

(86) PCT No.: PCT/CA2013/000576
§ 371 (c)(1),
(2) Date: Dec. 15, 2014

(87) PCT Pub. No.: WO2013/185220
PCT Pub. Date: Dec. 19, 2013

(65) Prior Publication Data
US 2015/0142544 A1    May 21, 2015

Related U.S. Application Data

(60) Provisional application No. 61/660,193, filed on Jun. 15, 2012.

(51) Int. Cl.
*G06Q 30/02* (2012.01)
*G06Q 20/40* (2012.01)
(Continued)

(52) U.S. Cl.
CPC ......... *G06Q 30/0222* (2013.01); *G06Q 20/10* (2013.01); *G06Q 20/3224* (2013.01);
(Continued)

(58) Field of Classification Search
CPC .......... G06Q 30/0279; G06Q 30/0222; G06Q 20/00; G06Q 30/0229; G06Q 20/10; G06Q 20/3224; G06Q 20/40; G06Q 30/0207
(Continued)

(56) References Cited

U.S. PATENT DOCUMENTS 5,945,653 A * 8/1999 Walker ................. G06Q 20/341
235/375
6,850,901 B1 * 2/2005 Hunter .................. G06Q 20/04
705/26.35
(Continued)

FOREIGN PATENT DOCUMENTS

CN          1702694 A * 11/2005
WO     WO-0199071 A2 * 12/2001 ......... G06Q 20/3825
(Continued)

OTHER PUBLICATIONS https://dictionary.cambridge.org/us/dictionary/english/smartphone. Jun. 5, 2020 (Year: 2020).*
(Continued)

*Primary Examiner* — Tan D Nguyen
(74) *Attorney, Agent, or Firm* — Bradley K DeSandro; Desandro Law Group PLLC

(57) ABSTRACT

An open loop cashless payment system incents a consumer account holder to transact in a physical store with a merchant who agrees to make an auditable donation to a charity when the transaction is conducted on an account issued to the consumer account holder. The consumer account holder may direct the donation to a specific charity within a predetermined geographically determined community where the transaction was physically conducted. The consumer account holder can register an obligation to make a donation matching that of the merchant, where the consumer account holder's donation is initially paid by the consumer account's
(Continued)

issuer for reimbursement by the consumer account holder to the issuer after the consumer account holder receives their account statement. The merchant's acquirer, the issuer, and a transaction handler for the issuer and acquirer may also make donations as directed by the consumer account holder. Various donor and consumer account holder directed business rules may limit the total currency amount of donations over specific calendar periods.

21 Claims, 9 Drawing Sheets

(51) Int. Cl.
*G06Q 20/10* (2012.01)
*G06Q 20/32* (2012.01)
(52) U.S. Cl.
CPC ......... *G06Q 20/40* (2013.01); *G06Q 30/0207* (2013.01); *G06Q 30/0279* (2013.01)
(58) Field of Classification Search
USPC ....................................................... 705/329
See application file for complete search history.

(56) References Cited

U.S. PATENT DOCUMENTS

| | | | |
|---|---|---|---|
| 6,876,971 B1 | 4/2005 | Burke | |
| 8,336,762 B1* | 12/2012 | DiMattina | G06Q 20/20 235/377 |
| 2004/0225473 A1* | 11/2004 | Aoki | G06Q 20/40 702/181 |
| 2006/0122856 A1* | 6/2006 | Rushton | G06Q 30/02 705/329 |
| 2006/0122874 A1* | 6/2006 | Postrel | G06Q 30/02 705/26.1 |
| 2009/0173782 A1* | 7/2009 | Muscato | G06Q 20/10 235/379 |
| 2010/0070359 A1* | 3/2010 | Heasley | G06Q 20/10 705/14.17 |
| 2010/0174649 A1* | 7/2010 | Bouchard | G06Q 20/02 705/44 |
| 2010/0258620 A1* | 10/2010 | Torreyson | G06Q 20/3572 235/379 |
| 2011/0238517 A1* | 9/2011 | Ramalingam | H04W 4/029 705/26.1 |
| 2012/0284187 A1* | 11/2012 | Hammad | G06Q 20/32 705/44 |
| 2012/0284188 A1* | 11/2012 | Vasquez | G06Q 30/0601 705/44 |
| 2013/0046635 A1* | 2/2013 | Grigg | G06Q 30/0238 705/14.58 |
| 2014/0012739 A1* | 1/2014 | Wall | G06Q 20/20 705/39 |
| 2015/0006426 A1* | 1/2015 | Sobhani | G06Q 20/06 705/329 |

FOREIGN PATENT DOCUMENTS

| | | | | |
|---|---|---|---|---|
| WO | WO-2010141270 A2 | * | 12/2010 | ............. G06Q 30/02 |
| WO | WO-2011017613 A2 | * | 2/2011 | ............. G07F 9/009 |
| WO | WO-2011163251 A2 | * | 12/2011 | ............. G06Q 20/02 |

OTHER PUBLICATIONS

IP.IQ.com Searches, Jan. 2, 2021 (Year: 2021).*
Kannan, P.K., "Wireless Commerce: Marketing Issues and Possibilities", Jan. 1, 2001, Proceedings of the 34 Annual Hawaii Inter. Conference on System Sciences, pp. 6.pp, Abstract. (Year: 2001).*
Alan R. Andreasen, "Profits for Nonprofits: Find a Corporate Partner", Nov.-Dec. 1996, Harvard Business Review, pp. 47-59. (Year: 1996).*
Arnold Kamis, "A flow-based model of web site intentions when users customize products in business-to-consumer electronic commerce," 2008, Information System Frontier, 12:157-168. (Year: 2008).*

* cited by examiner

Interchange Center Systems 540

Dual Message | Single Message

Authorization — Authorization System 542

Single Message System (SMS) 546

Clearing — Clearing And Settlement System 544

Settlement — Settlement Service 548

*Fig. 5*

Merchant Charitable Donations
Merchant ID: EIN # 12-345-67890

| Day | Time (HH:MM) | % | Min | Max | Charity |
|---|---|---|---|---|---|
| 001 | 99:99 – 99:99 | 9.99 | 9.99 | 99.99 | 999(i)(j) |
| 001 | 99:99 – 99:99 | 9.99 | 9.99 | 99.99 | 999(i)(j) |
| 002 | 99:99 – 99:99 | 9.99 | 9.99 | 99.99 | 999(i)(j) |
| 002 | 99:99 – 99:99 | 9.99 | 9.99 | 99.99 | 999(i)(j) |
| 003 | 99:99 – 99:99 | 9.99 | 9.99 | 99.99 | 999(i)(j) |
| * * * | * * * | * * * | | | * * * |
| 354 | 99:99 – 99:99 | 9.99 | 9.99 | 99.99 | 999(i)(j) |
| 354 | 99:99 – 99:99 | 9.99 | 9.99 | 99.99 | 999(i)(j) |
| 355 | 99:99 – 99:99 | 9.99 | 9.99 | 99.99 | 999(i)(j) |
| 355 | 99:99 – 99:99 | 9.99 | 9.99 | 99.99 | 999(i)(j) |
| 356 | 99:99 – 99:99 | 9.99 | 9.99 | 99.99 | 999(i)(j) |

Maximum Donations: Year: $99999; Qtr: $9999;
Mo: $9999; Day: $999

*Fig. 7(a)*

Account Holder Directed
Merchant Funded Charitable Donations
Account No. Ending 1235

| % | Charity | Match (Y/N) | Year | Qtr | Mo | Day |
|---|---|---|---|---|---|---|
| 99 | 999(i)(j) | Y | $999 | $99 | $99 | $9 |
| 99 | 999(i)(j) | N | N/A | N/A | N/A | N/A |
| 99 | 999(i)(j) | Y | $999 | $99 | $99 | $9 |
| * * * | * * * | | * * * | | | * * * |
| 99 | 999(i)(j) | Y | $999 | $99 | $99 | $9 |
| 99 | 999(i)(j) | N | N/A | N/A | N/A | N/A |
| 99 | 999(i)(j) | N | N/A | N/A | N/A | N/A |
| 99 | 999(i)(j) | N | N/A | N/A | N/A | N/A |

100%

Maximum Matching Donations: Year: $999; Qtr: $99;
Mo: $99; Day: $9

*Fig. 7(b)*

SYSTEMS AND METHOD FOR INCENTING CONSUMERS

FIELD

The embodiments described herein relate to incentives by merchants to encourage consumers to make a purchase, and in particular, to systems and methods for to a merchant encouraging a consumer to conduct a transaction while physically present in a store.

BACKGROUND

Merchants may use techniques to encourage consumers to make a particular purchase. These techniques may be in the form of monetary incentives, relying on the principle that a lower price will result in increased sales. Merchants may employ these techniques, for example, to help clear inventory before a new season's merchandise is released, to ease the release of a new product, to increase sales near the end of the fiscal year, to compete with a competitor over particular products, or to generally spur sales.

Monetary incentives may come in the form of a "sale" (i.e. temporary reduction in price at the register), a discount coupon, a mail-in rebate (i.e. a refund of part or the entire purchase price by mail), or a store credit (i.e. credit that can be applied to another store purchase). These incentives may only apply to a particular product or may have a time component. For example, a sale may only apply to a particular brand of dishwasher purchased on a particular holiday weekend and a rebate may only be valid for computers purchased within two weeks before the start of classes at a university.

For some credit transactions, a merchant may also use a statement credit as a monetary incentive. A statement credit is an amount refunded back to a credit account and appears on the consumer account holder's account statement. Using a statement credit as a monetary incentive involves two distinct transactions. In the first transaction, the merchant charges the full amount to a consumer's credit account. In the second transaction, the amount of the monetary incentive is then refunded back to the consumer's credit account as a statement credit.

Statement credit campaigns offer an advantage for merchants over other types of monetary incentive programs because a transaction handler, such as Visa Inc. or Master-Card Inc., largely handles the administration of the campaign. Once a statement credit campaign is arranged and initiated between a merchant and transaction handler, the transaction handler tracks the statement credit, matches the statement credit to qualifying purchases, and credits the amount of the statement credit to the purchaser's account. The transaction handler then collects the aggregate amount of the statement credits made to multiple purchasers from the merchant.

Although consumers are typically incented to make purchases by a form of price reduction, non-monetary reasons also motivate consumers to make purchases with a merchant, for instance where the consumers believes that the merchant is a force for good and thus the consumers are non-monetarily incented to do business with the merchant who they deem worthy of such support.

A general problem for merchants, especially small to mid-sized merchants, is efficiently administering monetary incentive programs where less money is paid at the time of transaction by the consumer, or where money is refunded to the purchaser, whether it is a discount coupon, a mail-in rebate program, a store credit, or a statement credit campaign. Larger merchants may undertake this responsibility themselves. However, the more processing a merchant must undertake, the more the administrative costs of the program may outweigh any benefits. In order to reduce administrative costs, some merchants arrange for third parties to handle the processing and other administrative aspects of these programs. In any case, the projected benefit of the program must be substantially more than the administrative costs. A program with a low administration cost may therefore be more desired.

Another problem for merchants, especially small to mid-sized merchants, is that an increasing number of transactions are conducted online instead of inside brick and mortar stores. Online transactions conducted with larger merchants can represent a loss in sales to traditional small and medium size merchants whose main business method to attract sales is a traditional retail, brick and mortar store environment, instead of mail orders, telephone orders, or electronic commerce (e-commerce) transactions. The loss of the in-store purchase is a lost opportunity for the local merchant and local consumer to get to know each other, personally, and a lost opportunity for the local consumer to become a live advertisement for the merchant's retail store and its wares. Online sales also prohibit the traditional brick and mortar merchant from an opportunity to sell to consumers in a retail environment best understood by the merchant.

The loss of in-store purchases to online sales may cause economic problem for traditional small and medium size merchants and the communities they serve. In some neighborhoods, the number of small retail shops has dramatically declined, leaving community commercial areas in a state of blight and disuse. In addition to economic downturn sensitivities, small, family-owned stores also face extinction threats from sophisticated online retailers, with resultant losses to local community retail diversity and neighborhood health with the death of the neighborhood 'mom-and-pop' store. Neighborhood streets can seem vacant during the day and open only after 5 p.m. to serve only one demographic, namely young urban professionals with disposable income. Previously successful businesses have been closing when e-commerce competition from online auctions and retails attract previously loyal neighbors.

There exists a need for improved systems and methods for incenting consumers, or at least alternatives.

SUMMARY

In a first aspect, embodiments described herein provide a method for incenting consumers to conduct in-store transactions with merchants, wherein the method is implemented using a processor and a memory coupled to the processor and configured to store instructions executable by the processor to perform the method comprising: receiving, at the processor, authorization data for a transaction on an account of a consumer account holder, wherein the account is issued by an issuer, wherein the transaction is acquired for clearing and settlement by an acquirer for a merchant account holder through a transaction handler in communication with both the issuer and the acquirer, wherein the authorization data is derived from at least one of an authorization request and an authorization response, wherein the authorization request is sent to the issuer from the merchant account holder through the transaction handler and the acquirer, wherein the authorization response is sent by the issuer to the merchant account holder through the transaction handler and the acquirer in response to the authorization request; determining, using the authorization data and the processor, a probability that the consumer account holder or agent thereof was physically present with the merchant account holder when conducting the transaction; and transmitting a donation amount to a charity when the determined probability exceeds a predetermined threshold, wherein the donation amount is determined using the transaction, the consumer account holder, and the merchant account holder.

In accordance with embodiments described herein, the authorization data may indicate whether a portable electronic storage device storing an identifier for the account was physically present with the merchant account holder.

In accordance with embodiments described herein, the authorization data may indicate whether the identifier for the account was electronically read from the portable electronic storage device by a reader co-located with the merchant account holder.

In accordance with embodiments described herein, the reader is selected from the group consisting of a magnetic stripe reader, a contact chip reader, a Near Field Communication (NFC) reader, a contactless payment card reader, and a wireless communication reader.

In accordance with embodiments described herein, the authorization data indicates whether the transaction is not a Card Not Present (CNP) transaction.

In accordance with embodiments described herein, the authorization data indicates whether a card verification value was used for the transaction.

In accordance with embodiments described herein, the authorization data indicates whether signature identification was used for cardholder identification data.

In accordance with embodiments described herein, the authorization data indicates whether a Personal Identification Number (PIN) was entered for the transaction.

In accordance with embodiments described herein, the authorization data indicates whether address verification information for the account holder was received by the merchant account holder.

In accordance with embodiments described herein, the method may further comprise:

receiving transaction data comprising a date and a time of the transaction, and an identifier for the merchant account holder, wherein the transaction data is derived from the authorization response; determining whether the date and time is within a predetermined time period; upon determining that the date and time is within a predetermined time period, determining, using the identifier for the merchant account holder and the processor, a geographic location for the merchant account holder, wherein the geographic location is within a predetermined geographical community; and selecting the charity from a plurality of potential charities, wherein the charity services the predetermined geographical community.

In accordance with embodiments described herein, the geographic location for the merchant is determined using a logical address for the merchant.

In accordance with embodiments described herein, the donation amount is transmitted to the logical address for the merchant.

In accordance with embodiments described herein, the predetermined time period corresponds to an offer provided by the merchant account holder to the consumer account holder.

In accordance with embodiments described herein, the method may further comprise: receiving an identifier for the consumer account holder, wherein the identifier is derived from the authorization request; determining, using the identifier for the consumer account holder and the processor, a geographic location for the consumer account holder, wherein the geographic location is within a predetermined geographical community; and selecting the charity from a plurality of potential charities, wherein the charity services the predetermined geographical community.

In accordance with embodiments described herein, the method may further comprise: receiving a currency amount for the transaction; determining, using the identifier for the merchant account holder and the processor, whether there are additional transactions for the merchant account holder during the predetermined time period; receiving an additional currency amount for the additional transactions; and deriving a total currency amount as the sum of the currency amount for the transaction and the additional currency amount for the additional transactions, wherein the donation amount determined using the total currency amount.

In accordance with embodiments described herein, the method may further comprise determining a difference between the donation amount and the total currency amount and transmitting the difference to the merchant account holder.

In accordance with embodiments described herein, the method may further comprise: receiving a donation receipt within a predetermined audit time period relating to the predetermined time period, wherein the donation receipt includes the identifier for the merchant account holder, an identifier for the charity, and the donation amount.

In another aspect, embodiments described herein may provide a non-transitory computer-readable medium storing one or more sequences of instructions which, when executed by one or more processors, causes the one or more processors to perform methods described herein.

In a further aspect, embodiments described herein may provide a system for incenting consumers to conduct in-store transactions with merchants: an issuer for issuing an account to a consumer account holder; an acquirer for a merchant account holder, wherein the acquirer performs clearing and settlement through a transaction handler in communication with both the issuer and the acquirer; and a donation services server comprising a processor and a memory coupled to the processor and configured to store instructions executable by the processor to configure the donation services server to: receive authorization data for a transaction on the account, wherein the authorization data comprises at least one of an authorization request and an authorization response, wherein the authorization request is sent to the issuer from the merchant account holder through the transaction handler and the acquirer, wherein the authorization response is sent by the issuer to the merchant account holder through the transaction handler and the acquirer in response to the authorization request; determine, using the authorization data, a probability that the consumer account holder or agent thereof was physically present with the merchant account holder when conducting the transaction; and transmit a donation amount to a charity when the determined probability exceeds a predetermined threshold, wherein the donation amount is determined using the transaction, the consumer account holder, and the merchant account holder.

In further aspect, embodiments described herein may provide a method for incenting consumers to conduct in-store transactions with merchants, wherein the method is implemented using a processor and a memory coupled to the processor and configured to store instructions executable by the processor to perform the method comprising: receiving, at the processor, authorization data for a transaction on an account of a consumer account holder, wherein the account is issued by an issuer, wherein the transaction is acquired for clearing and settlement by an acquirer for a merchant account holder through a transaction handler in communication with both the issuer and the acquirer, wherein the authorization data is derived from at least one of an authorization request and an authorization response, wherein the authorization request is sent to the issuer from the merchant account holder through the transaction handler and the acquirer, wherein the authorization response is sent by the issuer to the merchant account holder through the transaction handler and the acquirer in response to the authorization request; determining, using the authorization data and the processor, whether the consumer account holder or agent thereof was physically present with the merchant account holder when conducting the transaction; and upon determining that the consumer account holder was physically present with the merchant account holder when conducting the transaction, transmitting a donation amount to a charity, wherein the donation amount is determined using the transaction, the consumer account holder, and the merchant account holder.

In accordance with embodiments described herein, the authorization data may comprise one or more members of the group consisting of: data indicating whether a portable electronic storage device storing an identifier for the account was physically present with the merchant account holder, data indicating whether an identifier for the account was electronically read from a portable electronic storage device by a reader co-located with the merchant, data indicating whether the transaction is not a Card Not Present (CNP) transaction, data indicating whether a card verification value was present, data indicating whether signature identification was used for cardholder identification data, data indicating whether a Personal Identification Number (PIN) was entered, and data indicating whether address verification information for the account holder was received.

In accordance with embodiments described herein, the method may further comprise: receiving an identifier for the merchant account holder, wherein the identifier is derived from the authorization response; determining, using the identifier for the merchant account holder, a geographic location, wherein the geographic location is within a predetermined geographical community; and selecting the charity from a plurality of potential charities, wherein the charity services the predetermined geographical community.

In accordance with embodiments described herein, the method may further comprise:

receiving an identifier for the consumer account holder, wherein the identifier is derived from the authorization request; determining, using the identifier for the consumer account holder, a geographic location, wherein the geographic location is within a predetermined geographical community; and selecting the charity from a plurality of potential charities, wherein the charity services the predetermined geographical community.

In a further aspect, embodiments described herein may provide a method for incenting consumers to conduct in-store transactions with merchants, wherein the method is implemented using a processor and a memory coupled to the processor and configured to store instructions executable by the processor to perform the method comprising: receiving, at the processor, a status that an authorization for a transaction on an account of a consumer account holder is taking place, wherein the account is issued by an issuer, wherein the transaction is acquired for clearing and settlement by an acquirer for a merchant account holder through a transaction handler in communication with both the issuer and the acquirer; receiving, at the processor, a signal geolocating a mobile device identified to the consumer account holder; determining, using the status, the signal, and the processor, a probability that the consumer account holder or agent thereof was physically present with the merchant account holder when conducting the transaction; and transmitting a donation amount to a charity when the determined probability exceeds a predetermined threshold, wherein the donation amount is determined using the transaction, the consumer account holder, and the merchant account holder.

In another aspect, embodiments described herein may provide a method for incenting consumers to conduct in-store transactions with merchants, wherein the method is implemented using a processor and a memory coupled to the processor and configured to store instructions executable by the processor to perform the method comprising: receiving, at the processor, interchange data for setting an interchange rate for transaction on an account of a consumer account holder, wherein the account is issued by an issuer, wherein the transaction is acquired for clearing and settlement by an acquirer for a merchant account holder through a transaction handler in communication with both the issuer and the acquirer; determining, using the interchange data and the processor, a probability that the consumer account holder or agent thereof was physically present with the merchant account holder when conducting the transaction; and transmitting a donation amount to a charity when the determined probability exceeds a predetermined threshold, wherein the donation amount is determined using the transaction, the consumer account holder, and the merchant account holder.

In accordance with embodiments described herein, the method may further comprise determining whether the transaction is an in-store debit transaction or an in-store credit transaction using the interchange data and the processor, and wherein the donation amount is determined based on whether the transaction is the in-store debit transaction or the in-store credit transaction.

In another aspect of embodiments described herein there is provided a computer-implemented method where, for each transaction between a consumer account holder and a merchant, information may be received that is derived from an authorization request and/or an authorization response for the transaction, where the information may include the date and the time, a currency amount, and an identifier for the merchant. For each transaction, there may be received information derived from authorization data indicative that the account holder or agent thereof was physically present with the merchant. A determination may be made using the received information, whether the portable electronic storage device storing an identifier for the account was physically present with the merchant. For each transaction for which the determination is affirmative, and for each transaction for which the date and time of the corresponding authorization response are within a predetermined time period, and for each identifier for the merchant, there may be a deriving of the sum of the currency amounts by using the identifier for the merchant to access a database to retrieve: (i) the logical address for the merchant corresponding to the identifier for the merchant and (ii) a business rule for making a donation corresponding to an identifier for a charity having a logical address, wherein in the donation may be a function, at least in part, of the sum of the currency amounts. There may also be a deriving, using the business rule and the sum of the currency amounts, of the donation. A transmission may be made to the logical address for the merchant that includes the donation to the charity for the predetermined time period. Within a predetermined audit time period for and after the predetermined time period, a plurality of donation receipts are received, each including (i) the respective identifiers for the charity and the merchant and (ii) a currency amount. For each identifier for the merchant, the sum of the currency amounts of the donation receipts for each said identifier for the charity may be derived.

After the predetermined audit time period for the predetermined time, for each identifier for the merchant, and for each identifier corresponding to each charity to whom a donation was to be made as per the retrieved business rule, a determination may be made of a difference between: (i) the donation for the predetermined time period that was transmitted to the logical address of the merchant, and (ii) the sum of the currency amounts of the donation receipts received for the charity for the predetermined time period. Then, the determined difference is transmitted to the logical address for the merchant.

In various implementations, an account issued by an issuer to a consumer account holder can be a revolving credit account, a debit account, a checking account, a charge account, an Automatic Teller Machine (AMT) account, a stored value account, a prepaid account, a gift account, etc. An identifier for the account may be digitally stored as electronically readable medium in storage associated with a credit card, a debit card, a gift card, a stored value card, a physical token having thereon an information bearing magnetic stripe, a physical token having therein a digital information storage device in electrical communication with an electrical conductor to communicate information stored therein, a physical token having therein a digital information storage device in electrical communication with an antennae to communicate information stored therein via a wireless communication technology, a cellular telephone, a smart phone, a web enabled portable electronic device having a wireless communication technology by which to communicate information stored therein, or a combination of the foregoing.

In another aspect of embodiments described herein, the charities to which the merchant donates can be limited to those within the merchant's or consumer's geographic community. In still further implementations, the consumer account holders can designate those charities to which the merchant is to make a donation. In yet other embodiments, an acquirer for the transaction between the merchant and the consumer account holder may make the donation on the merchant's behalf incident to clearing and settling the transaction with the issuer that issued the account to the consumer account holder.

In still further aspects of embodiments described herein, in an open loop cashless payment system for making charitable donations, the merchant funds and makes direct payment of all donations to the merchant's designated charities according to a merchant designated business rule, wherein, in a variation thereof, the merchant funds and makes direct payment of all donations to merchant's designated charities in the merchant geographically defined community.

In yet further aspects of embodiments described herein, in an open loop cashless payment system for making charitable donations, the merchant funds and the merchant's acquirer makes direct payment, incident to a process of closing and settlement, of all donations to all account holder designated charities for those transaction conducted by the account holder with the merchant on an account issued to the account holder by an issuer.

In still further aspects of embodiments described herein, in an open loop cashless payment system for making charitable donations, the merchant funds and the merchant's acquirer makes direct payment, incident to a process of closing and settlement, of all donations to all consumer account holders designated charities for those transaction conducted by the account holder with the merchant on a consumer account issued to the account holder by an issuer, wherein, in a variation thereof, the donations are made to those charities having a physical location within the merchant geographically defined community.

In yet further aspects of embodiments described herein, in an open loop cashless payment system for making charitable donations, the merchant funds and makes direct payment of all donations to all consumer account holder designated charities for those transactions conducted by the consumer account holder with the merchant on an account issued to the consumer account holder by an issuer.

In still further aspects of embodiments described herein, in an open loop cashless payment system for making charitable donations, the merchant funds and makes direct payment of all donations to all consumer account holder designated charities for those transactions conducted by the consumer account holder with the merchant on an account issued to the consumer account holder by an issuer, wherein, in a variation thereof, the donations are made to those charities having a physical location within the merchant geographically defined community.

In still further aspects of embodiments described herein, in an open loop cashless payment system for making charitable donations, both the merchant and its acquirer fund donations to charities, incident to a process of closing and settlement, of all donations to all consumer account holder designated charities for those transaction conducted by the consumer account holder with the merchant on an account issued to the consumer account holder by an issuer, wherein, in a variation thereof, the donations are made to those charities having a physical location within the merchant geographically defined community, and wherein, in a still further variation thereof, a downward adjustment is made to an exchange fee assessed to the merchant by the merchant's acquirer such that the merchant is able to pay a lower exchange fee to compensate for the merchant's charitable contribution to the different consumer account holder designated charities, and the acquirer for the transaction also pays the same local charities a donation from the likely increased transaction volume.

In yet further aspects of embodiments described herein, in an open loop cashless payment system for making charitable donations, the merchant funds and its acquirer makes direct payment, incident to a process of closing and settlement, of all donations to all account holder designated charities for those transactions conducted by the account holder with the merchant on an account issued to the account holder by an issuer, wherein the account holder matches the merchant's contribution to the charity by the account holder's issuer making direct payment to that charity incident to a process of closing and settlement such that the charge for the account holder's charitable donation is rendered as a statement debit on the account holder's periodic revolving credit account statement.

BRIEF DESCRIPTION OF THE DRAWINGS

FIG. 5 illustrates exemplary systems housed within an interchange center to provide online and offline transaction processing for transactions conducted using the open loop payments processing system illustrated in FIG. 4;

FIGS. 7*a* and 7*b* illustrates screen shots characterizing exemplary user interfaces for a merchant and for a consumer account holder, respectively, to designate one or more charitable contributions to be made to respective charities incident to a transaction there between;

Implementations will become more apparent from the detailed description set forth below when taken in conjunction with the drawings, in which like elements bear like reference numerals.

DESCRIPTION OF VARIOUS EMBODIMENTS

Figure 1:
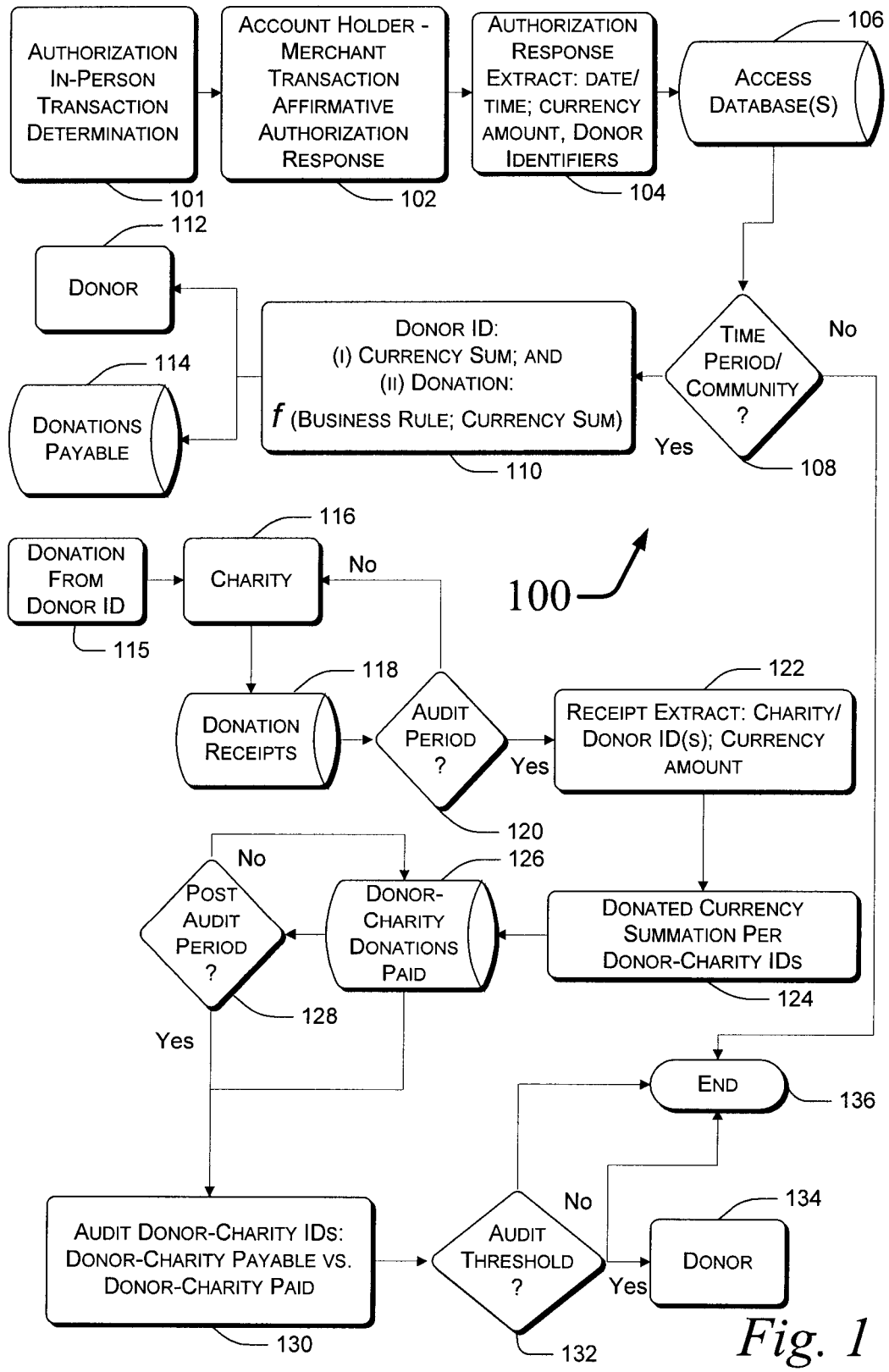
FIG. 1 is a flowchart illustrating an exemplary process for a merchant making a charitable contribution incident to a transaction conducted on an account issued to a consumer account holder in the merchant's brick and mortar store, where authorization and payment for the transaction occurs in an open loop cashless payment processing system.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Some embodiments described herein may provide systems and methods that incent neighborhood customers (e.g. consumers) to engage in neighborhood brick and mortar, in-store transactions where the consumer (or an agent thereof) is physically present within a merchant's store when conducting a transaction for a good or service. Some embodiments described herein may provide systems and methods that shift sales revenue towards neighborhood merchants away from electronically competing merchants. Some embodiments described herein may provide systems and methods that shift sales tax revenue towards neighborhood authorities that would otherwise be lost due to corresponding e-commerce transactions. Some embodiments described herein may provide systems and methods that incent local merchants in the community to receive foot traffic from customers doing in-person shopping with other brick and mortar merchants. Some embodiments described herein may provide systems and methods that disincentive customers who window-shop local merchants only to then buy on-line from electronic competitor merchants.

Some embodiments described herein may provide systems and methods (e.g. open loop cashless payment systems and methods) that incent consumer account holders to transact in a physical store with merchants who agree to make a donation to a charity when the transaction is conducted on an account issued to the consumer account holder. In some example embodiments, the consumer account holder may direct the donation to a specific charity within a predetermined geographically determined community where the transaction was physically conducted. In some example embodiments, the consumer account holder may register an obligation to make a donation matching that of the merchant, where the consumer account holder's donation is initially paid by the consumer account's issuer for reimbursement by the consumer account holder to the issuer after the consumer account holder receives their account statement. The merchant's acquirer, the issuer, and a transaction handler for the issuer and acquirer may also make donations as directed by the consumer account holder or the merchant account holder. Various donor and consumer account holder directed business rules may limit the total currency amount of donations over specific calendar periods.

Referring now to FIG. 1, therein is shown a flowchart which illustrates an exemplary process 100 for incenting consumers to conduct in-store transactions with merchants by making charitable contributions incident to in-person, brick and mortar store transactions in an open loop cashless payment processing system.

Prior to step 101, a consumer account holder offers to conduct a cashless transaction with a merchant on an account issued by an issuer to the consumer account holder. The merchant initiates an authorization request to determine whether the issuer, in an authorization response to the authorization request, will authorize the transaction. By way of example, the merchant's Point Of Service terminal (POS) may generate data that may be used to populate the authorization request. In some embodiments, the data for the authorization request may be used at step 101 to determine whether the account holder or agent thereof is physically present with the merchant (e.g. an in-store transaction). Further processing is halted at step 101 if it is determined that the transaction is not being conducted in-person. Otherwise, process 100 continues to step 102.

Embodiments described herein may use a methodology by which probabilistic distinctions can be made between transactions conducted inside a merchant's store (e.g. in-store transaction) and transactions that are not conducted inside a merchant's store. The innovative methodology may leverage payment processing system data used to set the merchant's interchange rate. One such set of data, by way of non-limiting example, is the data generated by a merchant's Point Of Service terminal (POS) and used to populate either or both of the authorization request and the authorization response. Authorization data, such as are used to populate the authorization request and the authorization response, may be useful in distinguishing between in-store transactions and those transactions that are not conducted in a brick and mortar store.

Examples of authorization data are provided in variety of publications, payment system association releases, rules, and other official documents, such as operating regulations, as are available from Visa Inc., Visa International Service Organization, American Express Corporation, MasterCard Corporation, and Novus Credit Services. Authorization data may also be explained, by way of example and not by way of limitation, in other publications, such as in the External Interface Specification (EIS) Authorization Record Formats publication, and all relevant versions thereof, from Vital Processing Services L.L.C. Authorization data may be further explained in the publication EMV Integrated Circuit Card Specifications for Payment Systems (the EMV specifications). The EMV specifications may be maintained by EMVCo. LLC. EMVCo. LLC, which is owned by American Express Corporation, MasterCard Corporation, JCB Co., Ltd, and Visa Inc., manages, maintains and enhances the EMV® Integrated Circuit Card Specifications, also known as 'Smart Card' specifications, to ensure global interoperability of chip-based payment cards with acceptance devices including Point Of Sale terminals (POS) and Automatic Teller Machines (ATM). Those of skill in the relevant arts may be familiar with explanations for data associated with an authorization of a transaction in a payment processing systems.

For example, a lesser expensive interchange rate may be paid by a merchant who accepts an in-store transaction. A more expensive interchange rate may be paid by a merchant who accepts a mail order, a telephone order, or an e-commerce transaction. In one example implementation, these types of transactions are Card-Not-Present (CNP) transactions. To determine the merchant's interchange rate for accepting an account holder's transaction, data is generated and then used to populate financial messaging network traffic. Data taken from an account holder's account information is used by the merchant's Point of Service terminal (POS), the merchant's acquirer, the account holder's issuer, and the transaction handler (i.e., VisaNet) to generate the data that is used to determine and assess the interchange rate to be paid by the merchant.

Example implementations are described herein which involve data processing techniques that examine authorization data that sets the merchant's interchange rate to indirectly determine whether a transaction took place inside a merchant's brick and mortar store (e.g. an in-store transaction). In other example implementations, a probability may be calculated using authorization data as to the likelihood that a transaction took place inside a merchant's brick and mortar store. In other example implementations, only those merchants who conducted such in-store transactions will be required to make a donation when authorization data generated by the payment processing system shows that the corresponding transaction is not a CNP or other high-interchange rate transaction.

Further example implementations may allow the merchant to make a bigger donation for a transaction where the account holder chooses to make an in-store debit card purchase instead of an in-store credit card purchase. A least expensive interchange rate may be paid by the merchant who accepts a debit card. A most expensive interchange rate may be paid by the merchant who accepts a credit card. Thus, example implementations may examine data that sets the merchant's interchange rate to indirectly determine whether a transaction was conducted on a debit or credit account, as well as in-person.

The information derived from the authorization request may be indicative as to whether the consumer account holder or agent thereof is physically present with the merchant when the information is indicative whether a portable electronic storage device storing an identifier for the account was physically present with the merchant.

The information derived from the authorization request may be indicative as to whether the account holder or agent thereof is physically present with the merchant when the information is indicative whether an the identifier for the account was electronically read from a portable electronic storage device by a reader co-located with the merchant, such as when the reader is indicated as being a magnetic stripe reader, a contact chip reader, a Near Field Communication (NFC) reader, a contactless payment card reader, a wireless communication reader, and the like.

The information derived from the authorization request may be indicative as to whether the account holder or agent thereof is physically present with the merchant when the information is indicative that the transaction is not a Card Not Present (CNP) transaction. For example, the authorization request may include an "Authorization Transaction Code", which is a field containing a code identifying the type of authorization or function being requested. One such type of transaction is a Card Not Present (CNP) transaction, meaning that an account card (e.g., debit or credit) was not present when the account holder, or agent thereof, offered to make purchase from the merchant.

The information derived from the authorization request may be indicative as to whether the account holder or agent thereof is physically present with the merchant when the information is indicative that a card verification value is present. For example, the authorization request may include a Card Verification Value (CVV) or equivalent thereof. By way of example, and not by way of limitation, the CVV field in the authorization request can be, for a Visa account, a Card Verification Value 2 (CV2), for a MasterCard account, a Card Validation Code 2 (CVC2), for an American Express account, a Cardholder Identification Code (CID), and the like. This value is typically printed on the front or back of Visa, MasterCard, and American Express cards. The CVV is typically not encoded in magnetic stripe information on a card, nor does it appear on a sales receipt printed by the POS or a peripheral printer. Rather, this number is typically read off the consumer account holder's card by a cashier and then entered into the POS by the cashier. The CVV is a field in the authorization request used in assigning a value that assists in authenticating the physical presence of a card having electronic storage of an identifier for the account or the Primary Account Number (PAN), for example, a Visa, MasterCard or American Express credit card.

The information derived from at least one of the authorization request and the authorization response may be indicative as to whether the account holder or agent thereof is physically present with the merchant when the information is indicative that signature identification was used for cardholder identification data. Stated otherwise, information in at least one of the authorization request and the authorization response may show that an account holder gave a handwritten signature to authorize the transition.

The information in at least one of the authorization request and the authorization response may be indicative as to whether the account holder or agent thereof is physically present with the merchant when the information is indicative that a Personal Identification Number (PIN) was entered. Stated otherwise, information in at least one of the authorization request and the authorization response may show that an account holder entered a PIN into a transaction computing device (or peripheral thereof) to authorize the transition.

The information in at least one of the authorization request and the authorization response may be indicative as to whether the account holder or agent thereof is physically present with the merchant when the information is indicative that address verification information for the account holder was received by the merchant. Stated otherwise, information in at least one of the authorization request and the authorization response may show that there is an address verification result code or a functional equivalent thereof. This code may provide additional authentication information to show that the cardholder verified their address. Address Verification may be performed when a determination is made that the transaction is a Card Not Present (CNP) transaction, when encoded information in a magnetic stripe on a card cannot be properly read by a reader, and other circumstances where an anomaly in conducting a brick and mortar transaction occurs.

Data generated during an authorization of transaction in a payment processing system may be examined to derive therefrom a probability that the account holder or agent thereof, who has a residential address in a neighborhood, was physically present in a merchant's brick and mortar store in the same neighborhood, when the transaction was being authorized. If the consumer account holder, or agent thereof, previously received an offer (e.g. a discount on a good or service if a transaction is conducted within a predetermined time period) from the merchant, and the consumer account holder's transaction is authorized prior to the expiration of the offer, then the merchant may make a donation to a charity that may serve the needs of the neighborhood where both the consumer account holder resides and the brick and mortar store is located.

Prior to a further discussion of FIG. 1, reference will now be made to FIG. 8 which illustrates an exemplary environment 800 of components and parties involved in transactions conducted between consumer account holders and merchants. Components of the environment 800 may be used to implement a system for incenting consumers to conduct in-store transactions with merchants.

In some example embodiments, a donation services server 801 (referred to as a Donation Audit Web Service in an example illustrative embodiment) is operable to determine whether a transaction between a consumer account holder and a merchant is an in-store transaction, or determine a probability that the transaction is an in-store transaction. The donation services server 801 may be used to implement process 100 (FIG. 1) at step 101 to determine whether the transaction is an in-store transaction.

Donation services server 801 may be implemented using a server and data storage devices configured with database (s) or file system(s), or using multiple servers or groups of servers distributed over a wide geographic area and connected via a network. Donation services server 801 may be connected to a data storage device 854 directly or via to a cloud based data storage device via a network. Donation services server 801 may be a cloud based server system. Donation services server 801 may reside on a networked computing device including a processor and memory, such as for example a computer, workstation, server, portable computer, mobile device, personal digital assistant, laptop, tablet, smart phone, WAP phone, an interactive television, video display terminals, gaming consoles, electronic reading device, and portable electronic devices or a combination of these. Donation services server 801 may include one or more processors that may be any type of processor, such as, for example, any type of general-purpose microprocessor or microcontroller, a digital signal processing (DSP) processor, an integrated circuit, a programmable read-only memory (PROM), or any combination thereof. Donation services server 801 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. Donation services server 801 may include one or more input devices, such as a keyboard, mouse, camera, touch screen and a microphone, and may also include one or more output devices such as a display screen and a speaker. Donation services server 801 has a network interface in order to communicate with other components, to receive data, to send data, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although only one donation services server 801 is shown for clarity, there may be multiple donation services servers 801 or groups of donation services servers 801 distributed over a wide geographic area and connected via e.g. network.

The components of the transaction environment 800, including donations services server 801, merchant computer system (n) 810, the acquirer computer system (i) 806, the transaction handler computer system 802, the consumer account holder system (p) 808, and the issuer computer system (j) 804, may be connect via a network. The network may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although not shown, the other components may connect to network via a firewall, which is a device, set of devices or software that inspects network traffic passing through it, and denies or permits passage based on a set of rules and other criteria. Firewall may be adapted to permit, deny, encrypt, decrypt, or proxy all computer traffic between network and components based upon a set of rules and other criteria. For example, firewall may be a network layer firewall, an application layer firewall, a proxy server, or a firewall with network address translation functionality. Network is operable to secure data transmissions using encryption and decryption.

Donation services server 801 is operable to receive authorization data incident to authorization of a transaction, which is illustrated by the connection block 852. For example, authorization data can be retrieved from at least one of the authorization request and the authorization response as they are being communicated between the merchant computer system (n) 810, the acquirer computer system (i) 806, the transaction handler computer system 802, and the issuer computer system (j) 804. The authorization request may be communicated between issuer (j) 804 and transaction handler 802 through access point 830 of a network. The authorization response may be communicated between acquirer (i) 806 and transaction handler 802 through access point 832 of a network.

Donation services server 801 is operable to process the received information to determine a probability that the transaction being authorized was conducted in the merchant's brick and mortar store. Donation services server 801 is operable to perform data analysis to determine a probability by accessing to one or more data storage devices 854(*d*), where d is an integer not less than 1. Each data storage device 854 may contain authorization information pertaining to different payment processing systems and related environments in which transactions with merchants are conducted on accounts issued by issuers to account holders. By way of example, and not by way of limitation, each database 854 may contain explanations for authorization data as are found in publications, payment system association releases, rules, and other official documents, such as operating regulations, as are available from Visa Inc., Visa International Service Organization, American Express Corporation, MasterCard Corporation, and Novus Credit Services.

One such data storage device 854(*d*) may contain, for one such payment processing system, information that may be used by donation services server 801 to interpret information in at least one of the authorization request and the authorization response, including by way of example and not by way of limitation: (i) Card Brand (e.g., Visa, MasterCard, American Express); (ii) Account Type (e.g., debit, credit, gift, stored value); (iii) Acquirer Authorization Specifications; (iv) Issuer Authorization Specifications; (v) specifics pertaining to a physical location of a merchant and authorization particularities for different Merchant Types (e.g., Merchant Commodity Code); (vi) POS Type; (vii) Card Reader Type (contactless, magnetic strip, contact chip, etc.); (viii) Interchange Rate; (ix) Card Present Specifications; (xi) Card Not Present Specifications; (xii) specifics pertaining to authorization particularities for different Transaction Types, (xiii) miscellaneous. Access to data storage device 854(*d*) may be helpful to interpret authorization information for a transaction and thereby determine or otherwise derive a probability or likelihood that a purchase on an account took place in a brick and mortar store during the authorization thereof.

Data storage devices 854 (e.g. memory, etc.) may include a relational database (such as a SQL database), or other suitable data storage devices. The data storage devices 854 are configured to host data about the transactions. The data storage devices 34 may store authorization criteria that define what actions may be taken by components and what data may be received from and retrieved by components of environment 800. In some embodiments, the authorization criteria may include at least one security profile associated with at least one role. In some embodiments, authorization criteria may be defined for specific components (e.g. donation services server 801) and used as a security measure to gain access to data storage devices 854. The data storage devices 854 may also be configured to store other information, such as personal information about the consumer account holders and the merchant account holders.

Figure 8:
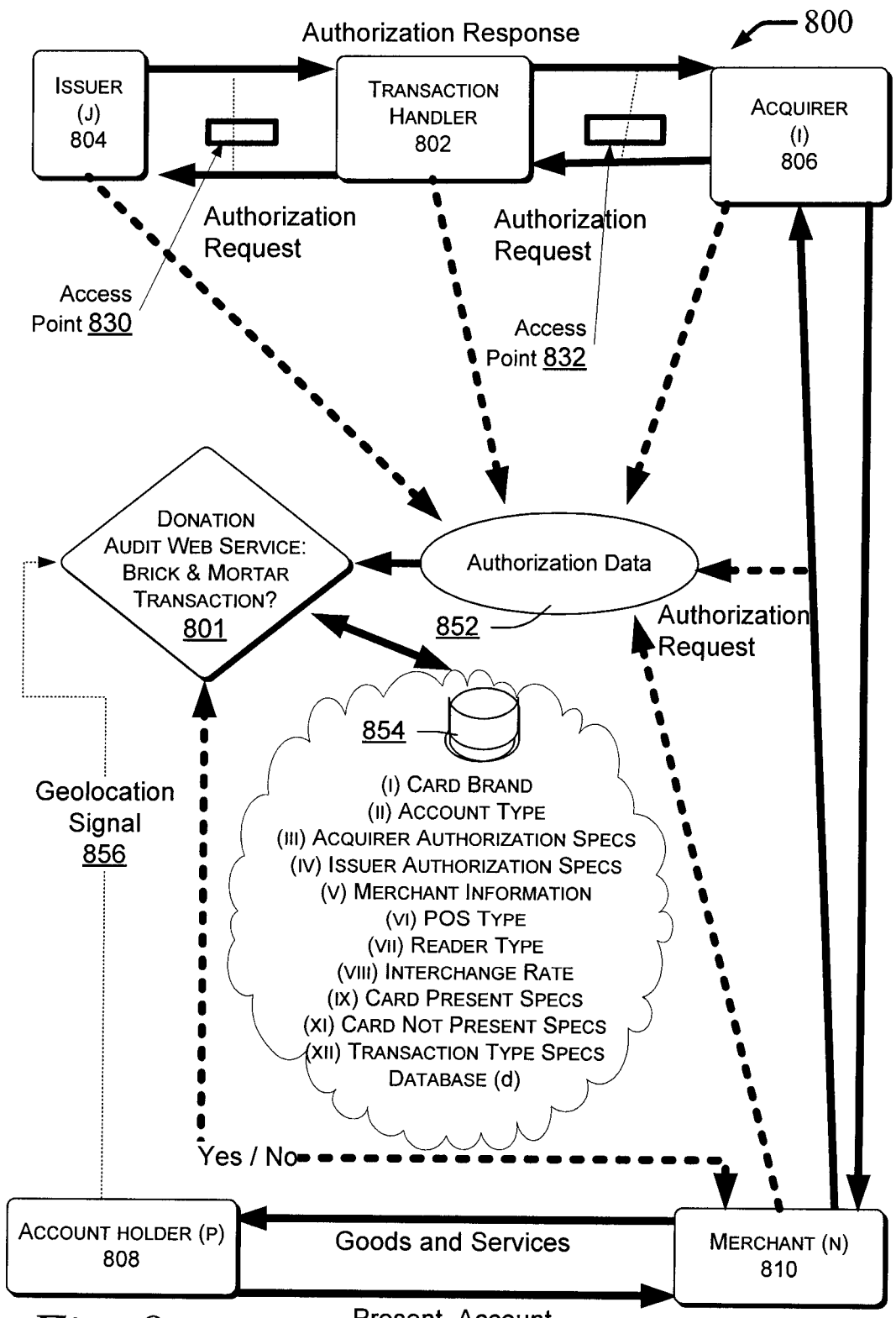
FIG. 8 illustrates an exemplary open loop payments processing system for processing transactions conducted by merchants with account holders, wherein, for each transaction, authorization data (e.g., from one of the authorization request and authorization response) is analyzed, in conjunction with access to one or more payment processing system authorization system characteristics databases, to determine a probability as to whether the consumer account holder was physically present in the merchant's brick and mortar store during authorization of the transaction.

In some example embodiments, shown at 856 in FIG. 8, either alone or in combination with other embodiments described herein, geolocation signals emitted by a mobile electronic device and identified to the consumer account holder (p) 808 (i.e., a web enabled cellular telephone used by the consumer account holder (p) 808) may be monitored during authorization of a transaction on an account issued to the consumer account holder (p) 808 to ascertain that the mobile device was simultaneously proximal a corresponding geolocation of a brick and mortar store of the merchant with whom the transaction was conducted. Donation services server 801 is operable to use the data from geolocation signals to determine whether a transaction involving a consumer account holder 808(*p*) and a merchant 810 (*n*) is an in-store transaction, or a probability that the transaction is an in-store transaction.

Figure 9:
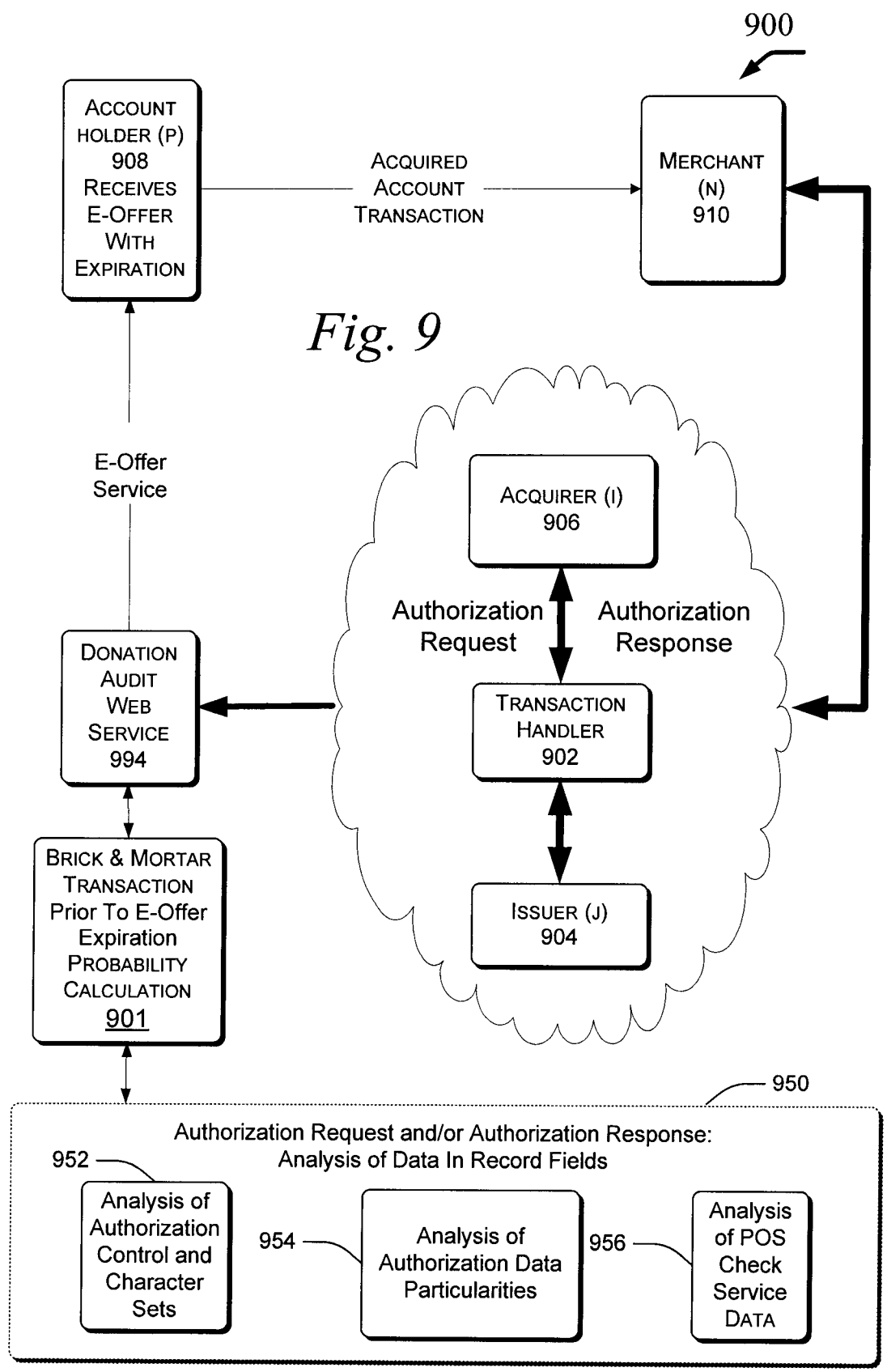
FIG. 9 is a flowchart illustrating an exemplary process for a merchant to have a time sensitive electronic offer sent to an account holder which, if accepted by conducting the transaction in person at the merchant's brick and mortar store, the merchant will make a charitable contribution to a local charity, where data from at least one of the transaction's the authorization request and the authorization response is analyzed to determine: (i) whether the transaction was accepted prior to expiration of the offer; and (ii) a probability that the account holder conducting the transaction in person at the merchant's brick and mortar store.

Referring now to FIG. 9, there is shown another block diagram of the environment for conducting a transaction involving a consumer account holder (p) 908, a merchant (n) 910, an acquirer (i) 906, a transaction handler 902, an issuer (j) 904, and donation services server 994.

Similar to the donation services server 801 of FIG. 8, a donation services server 994 (referred to as a Donation Audit Web Service in an example illustrative embodiment) is operable to determine whether a transaction between a consumer account holder and a merchant is an in-store transaction, or determine a probability that the transaction is an in-store transaction. Donation services server 994 may be used to implement process 100 (FIG. 1) at step 101 to determine whether the transaction is an in-store transaction.

Donation services server 994 may be implemented using a server and data storage devices configured with database (s) or file system(s), or using multiple servers or groups of servers distributed over a wide geographic area and connected via a network. Donation services server 994 may be connected to a data storage device directly or via to a cloud based data storage device via a network. Donation services server 994 may be a cloud based server system. Donation services server 994 may reside on a networked computing device including a processor and memory, such as for example a computer, workstation, server, portable computer, mobile device, personal digital assistant, laptop, tablet, smart phone, WAP phone, an interactive television, video display terminals, gaming consoles, electronic reading device, and portable electronic devices or a combination of these. Donation services server 994 may include one or more processors that may be any type of processor, such as, for example, any type of general-purpose microprocessor or microcontroller, a digital signal processing (DSP) processor, an integrated circuit, a programmable read-only memory (PROM), or any combination thereof. Donation services server 994 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. Donation services server 994 may include one or more input devices, such as a keyboard, mouse, camera, touch screen and a microphone, and may also include one or more output devices such as a display screen and a speaker. Donation services server 994 has a network interface in order to communicate with other components, to receive data, to send data, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although only one donation services server 994 is shown for clarity, there may be multiple donation services servers 994 or groups of donation services servers 994 distributed over a wide geographic area and connected via e.g. network.

Donation services server 994 may be used to implement the example process 900 illustrated in FIG. 900 with reference to various system components involved in processing transactions. Donation Audit Web Service 994 sends a dated electronic offer on behalf of merchant (n) 910 to consumer account holder (p) 908. Consumer account holder (p) 908 may accept the electronic offer by offering to conduct a transaction on an account with merchant (n) 910. Merchant (n) 910 initiates the generation of information for an authorization request for the transaction and receives back information corresponding to an authorization response, where the authorization request and response are communicated between the acquirer (i) 806, the transaction handler 802, and the issuer (j) 804. Donation services server 994 receives information generated incident to the authorization of the transaction, for instance from at least one of the authorization request and the authorization response. Donation services server 994 is operable to process this received information (as shown at block 901) to determine a probability that the transaction being authorized was conducted in a brick and mortar store of merchant (n) 910 (e.g. an in-store transaction).

Donation services server 994 is operable to use a processor to perform data analysis to make the disclosed probability determination that a 'face-to-face' transaction is being authorized by performing an analysis of data in the fields of the records corresponding to at least one of the authorization request and the authorization response. Authorization data are explained in variety of publications, payment system association releases, rules, and other official documents, such as operating regulations, as are available from Visa Inc., Visa International Service Organization, American Express Corporation, MasterCard Corporation, Novus Credit Services, and the like.

Authorization data may be generated for an account based (a.k.a. card-based) transaction which may be transmitted from a transaction acquiring device, such as a Point-Of-Sale terminal (POS) or an Automated Teller Machine (ATM), through a series of networks, to a card issuing system for authorization against the card holder's account. The transaction data may contain information derived from the card (e.g., the account number bearing token), the terminal (e.g., the merchant number), the transaction (e.g., the amount), together with other data which may be generated dynamically or added by intervening systems. The card issuing system will either authorize or decline the transaction and generate a response message which must be delivered back to the terminal within a predefined time period.

ISO 8583 defines a message format and a communication flow so that different systems can exchange these transaction requests and responses. The vast majority of transactions made at ATMs use ISO 8583 at some point in the communication chain, as do transactions made when a customer uses a card to make a payment in a store (EFTPOS). In particular, both the MasterCard and Visa networks base their authorization communications on the ISO 8583 standard, as do many other institutions and networks. ISO 8583 may have no routing information, so is sometimes used with a TPDU header.

Account holder-originated transactions may include purchase, withdrawal, deposit, refund, reversal, balance inquiry, payments and inter-account transfers. ISO 8583 also defines system-to-system messages for secure key exchanges, reconciliation of totals, and other administrative purposes.

Although ISO 8583 defines a common standard, it may not be used directly by systems or networks. It defines many standard fields (data elements) which may remain the same in all systems or networks, and may leave a few additional fields for passing network specific details. These fields are used by each network to adapt the standard for its own use with custom fields and custom usages. Disclosed uses for ISO 8583 electronic financial messaging by donation services server 994 to perform the data analysis from which a probability determination can be made that a 'face-to-face' transaction is being authorized, include, by way of example of and not by way of limitation, as seen at block 950, an analysis of authorization control and character sets 952, an analysis of authorization data particularities for a payment processing system 954 (e.g., type of merchant, type of Point Of Service Terminal (POS)), an analysis of a POS check service data 956, and so on.

The data analysis performed by donation services server 994 at block 950 can interpret various fields in records of ISO 8583 electronic financial messages, including various fields identified in the following: (i) Authorization Transaction Code (i.e., Card Not Present (CNP) vs. standard purchase authorization request indicators); (ii) Address Verification Result Code; (iii) Card Acceptor Data; (iv) Merchant data field (name, city, state/province; (v) Card Sequence Number for a multi-card Primary Account Number (PAN); (vi) Card Verification Value; (vii) Card Verification Value (CW2) Result Code; (viii) Cardholder Certificate Serial Number; (ix) Cardholder Identification Data; (x) Address Verification Data; (xi) an Authorization Request Record Format (General vs. Retail vs. Travel & Entertainment vs. specific merchant types); (xii) various fields identified in an Authorization Request format (Debit Account Funding Transaction [VISA] or Debit Payment Transaction [MasterCard]); (xiii) various fields identified in an Authorization Request Format (Direct Debit); (xiv) various fields identified in an Authorization Request Format (EBT)—including. Identifiers for EBT/FS Return, EBT/CD Cash Withdrawal, EBT/FS Purchase, EBT/FS Electronic Voucher, EBT/CD Purchase or Purchase with cash-back; (xv) Authorization Request Format (Credit Account Funding Trans. [VISA] or Credit Payment Transaction [MasterCard] with CPS for Internet origination; (xvi) Authorization Request Format (Direct Marketing/Passenger Transport); (xvii) Authorization Request Format (Hotel/Lodging—Manual AVS); (xviii) Authorization Request Format (Automobile Rental); (xix) Authorization Request Format (3-D Secure); (xx) Incremental Authorization Format; (xxi) Authorization Reversal Format; (xxii) Generic Check Authorization Format; (xxiii) Certegy/Equifax Check Guarantee Request Message (Raw MICR); (xxiv) "SCAN"; (xxv) International Check Service (ICS) and ICS Check Guarantee (Account Number) Transaction Format; (xxvi) TeleCheck Check Guarantee Request Message (Keyed Full and Raw MICR); (xxvii) Authorization Request Format (Non-set Electronic Commerce; (xxviii) Authorization Request Format (Quasi Cash); (xxix) Authorization Request Format for POS Check Service; (xxx) Authorization Request Format (POS Check Service Reversal); (xxxi) Account Data Source (data indicative that the MICR data was acquired by an OCR reader), etc. These are non-limiting examples and other fields may be used to determine whether a transaction between an account holder and a merchant is an in-store transaction.

If the account holder (p) 908 had the transaction properly authorized at a time prior to the expiration of the electronic offer, and the account holder (p) 908 conducted the transaction in a brick and mortar store of the merchant, then the merchant (n) 910 will be obligated to make a donation to a charity where the services the needs of the neighborhood where the brick and mortar store is located and the account holder (p) 908 resides.

Returning back to FIG. 1, at step 102, an affirmative authorization response is generated by the issuer system and communicated to the merchant system, which may be through both an acquirer system for the merchant (e.g., the merchant's bank) and a transaction handler system for both the issuer and the merchant's acquirer (e.g., VisaNet® transaction processing service provided by Visa, Inc.). Some of the steps described in FIG. 1 may be implemented by a donation services server.

At step 104, data may be extracted from the affirmative authorization response, such as chronological information pertaining to the transaction including date and time, a currency amount of the transaction, and any other data desired to assist in making a charitable donation. This is a non-limiting example of extracted data. By way of example, an identifier for the merchant may be extracted from the authorization request. Also, an identifier for the account holder may be extracted, such as an account number for the account on which the transaction is being conducted. The account number, by way of non-limiting example, may be a Bank Identifier Number or BIN code, Using the merchant and/or account holder identifiers extracted from the affirmative authorization response, more information, such as respective identifiers for donors, may be looked up for the account holder's issuer, the merchant's acquirer, the transaction handler and the charity or charities via access to one or more data storage devices (e.g. hardware storing databases) at step 106. Such data storage device access may retrieve business rules used to calculate one or more donations that are to be made to the charity or charities by one or more donors respectively corresponding to the account holder, the account holder's issuer, the merchant, the merchant's acquirer, and the transaction handler. Stated otherwise, the donation may be a function of the amount of the transaction and the retrieved business rule(s).

Donations, per extracted donor IDentifier (ID), may be made for those transactions that occur during a predetermined time period and/or within a predefined geographic location as determined by query 108 (FIG. 1). If the result of query 108 is affirmative, process 100 moves to step 110 where the donations for the donors may be calculated as a function of the respective business rules, based on the amount of the transaction, total amounts of all transactions for the merchant or consumer, the merchant, the consumer account holder, and so on. Otherwise, no donation may be made and process 100 may terminate at step 136. In other example embodiments, donations may not be limited by a predetermined time period and/or within a predefined geographic location.

Donations calculated at step 110 may be communicated to the donor at step 112 and may be stored in a donations payable database 114. Thereafter, donations are received at charities at step 115 from donors identified by either respective donor IDs, which can respective identify the merchant, its acquirer, the transaction handler, the consumer account holder, its issuer, the transaction handler, or other donor.

Donations received may be stored in donation receipts database 118. Data from donations that are made by donors via communication to charities during an audit period, as determined at query 120, may be extracted at step 122 to generate donation receipts. The donation related data that may be extracted at step 122 may include the donor ID, the charity, a unique identifier for the donation, the currency amount of the donation, a geographic location or area, date, and so on. During the audit period, a sum of donations to each charity made by each donor for the audit period may be calculated at 124 and stored in a donor-charity donation paid data storage device at 126. After an audit period, as determined by query 128, differences in donations paid may be compared to donations payable for each donor at step 130. Differences exceeding a predetermined audit threshold, as determined by query 132, are communicated to the respective donors at step 134. Of course, the charitable audit functions, such as have been described above, can be performed by an agent of any donor and/or of a loyalty system organization charged with implementing all or portions of process 100. Such an auditing agent can be, by way of non-limiting example, a certified public accountancy agency, a non-government regulatory agency, a governmental agency, and the like.

In some example embodiments, in order for the merchant to be able to make a donation to a charity, the merchant may have made a pre-existing agreement with its acquirer to make a downward adjustment an exchange fee assessed to the merchant by the merchant's acquirer for processing a credit card transaction conducted on an account holder's account. As such, difference in the adjusted exchange fee may be the same or near what the merchant is obligated to donate to the charity so that the merchant has sufficient funds to make the contribution to the charity, where that charity may have been designated by the consumer account holder who conducted the transaction with the merchant. In a still further variation, each transaction may be conducted upon a revolving credit account issued by the issuer to the account holder in which the acquirer for the merchant assesses the merchant exchange fee for the transaction. A business rule for both the merchant and the acquirer for the merchant may dictate that both make respective donations, within the predetermined geographically designated community. The currency amount of these donations can be a function, at least in part, of the sum of the currency amount of the transaction; and the exchange fee that is assessed by the acquirer to the merchant for processing the credit card transaction through authorization, clearing and settlement.

Figure 2:
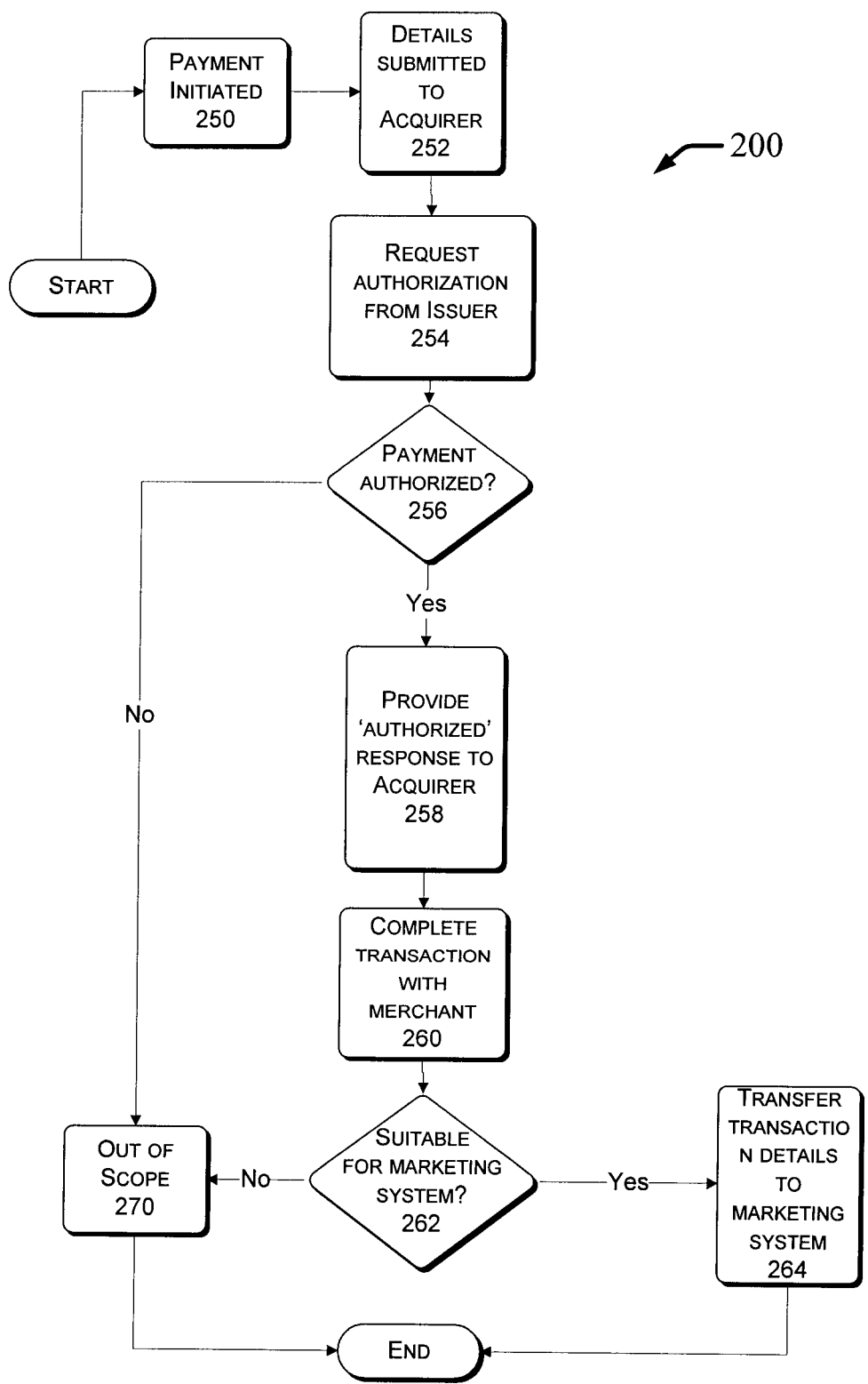
FIGS. 2, 3*a* and 3*b* are flowcharts that illustrate another exemplary process for making charitable contributions incident to transactions in an open loop cashless payment processing system.
Figures 3A, 3B:
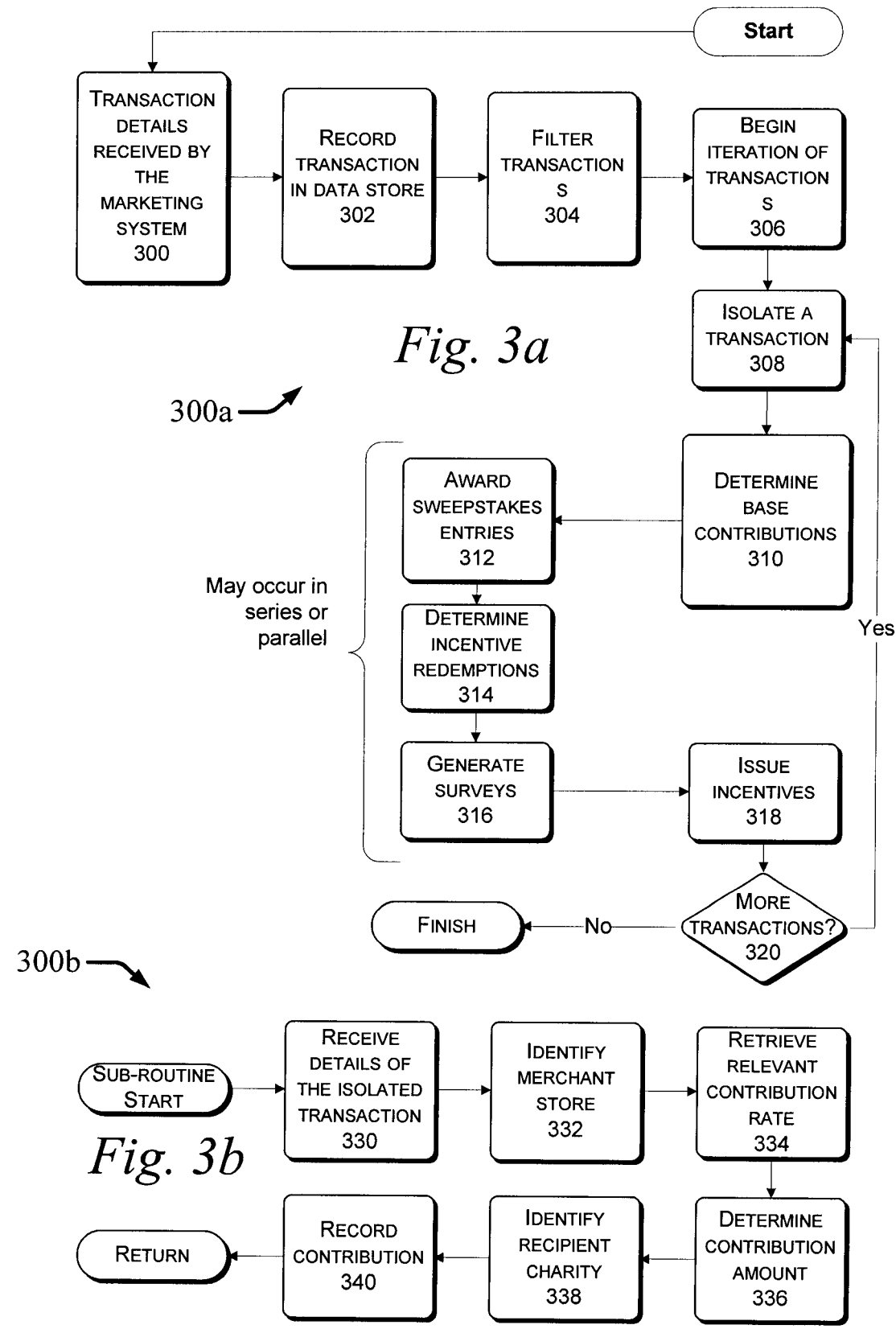

Referring now to FIGS. 2, 3a and 3b, the flowcharts in these figures illustrate exemplary processes 200, 300a and 300b by which charitable contributions may be made incident to transactions in an open loop cashless payment processing system.

At step 250 (FIG. 2), an account holder offers to conduct a cashless transaction with a merchant on an account issued by an issuer to the account holder. The merchant initiates an authorization request at step 252 to determine whether the issuer, in an authorization response to the authorization request, will authorize the transaction.

At steps 254 and 258 of FIG. 2, as determined by query 256, an affirmative authorization response is generated by the issuer and communicated to the merchant through both an acquirer for the merchant (e.g., the merchant's bank) and a transaction handler for both the issuer and the merchant's acquirer (e.g., VisaNet® transaction processing service provided by Visa, Inc.). As such, the account holder's authorized transaction with the merchant is completed at step 260.

In some embodiments, a query 262 may determine whether data is extracted from the affirmative authorization response indicates that the transaction is within an acceptable chronological time period and/or is being conducted within an acceptable geographic location. If not, then process 200 may be terminated. Otherwise, process 200 moves to step 264 where the extracted information pertaining to the transaction is transferred to a marketing system at step 300 (FIG. 3a). By way of example, the transferred information may include date, time, and a currency amount of the transaction, and any other data desired to assist in making a charitable donation By way of example, an identifier for the merchant may be extracted from the authorization request. Also, an identifier for the account holder may be extracted, such as an account number for the account on which the transaction is being conducted. The account number, by way of non-limiting example, may be a Bank Identifier Number or BIN code.

Using the merchant and/or account holder identifiers extracted from the affirmative authorization response, more information, such as respective identifiers for donors, may be looked up for the account holder's issuer, the merchant's acquirer, the transaction handler and the charity or charities via access to one or more data storage devices with databases. Such data storage devices access may retrieve business rules which may be used to calculate one or more donations that may be made to the charity or charities by one or more donors respectively corresponding to the account holder, the account holder's issuer, the merchant, the merchant's acquirer, and the transaction handler. Stated otherwise, the donor may be a function of the amount of the transaction and the retrieved business rule(s).

Upon receipt at step 300 (FIG. 3a) of the details from transactions, a process 300a may move to step 302 for storage of the details. At steps 304-308 there may be filtering, iterating, and isolating of the transactions to obtain those transactions for which base donations may be calculated at step 310. Donations, per extracted donor ID, may be made for those transactions that occur during a predetermined time period and/or within a predefined geographic location as determined by the filtering, iterating, and isolating of the transactions at steps 304-308. The contributions determined at step 310 may be followed in step 312 with a process of awarding account holder(s) with sweepstake entries as a further incentive to the account holder for transacting with merchants. Incentive redemptions may be determined at step 314, surveys may be generated for transacting account holders at step 316 and incentives are issued at step 318. Optionally, steps 312-316 may be performed in series or parallel within process 300a. After query 320 determines exhaustion of those transactions that were isolated in step 308, process 300a may terminate.

Note, that the filtering, iterating, and isolating of the transactions at steps 304-308 of query 108 is affirmative, process 100 may move to step 110 where the donations for the donors are calculated as a function of the respective business rules. Otherwise, no donation is made and process 100 may terminate at step 136.

Marketing system may be implemented using a server and data storage devices configured with database(s) or file system(s), or using multiple servers or groups of servers distributed over a wide geographic area and connected via a network. Marketing system may be connected to a data storage device directly or via to a cloud based data storage device via network. Marketing system may reside on any networked computing device including a processor and memory, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these. Marketing system may include one or more microprocessors that may be any type of processor, such as, for example, any type of general-purpose microprocessor or microcontroller, a digital signal processing (DSP) processor, an integrated circuit, a programmable read-only memory (PROM), or any combination thereof. Marketing system may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. Marketing system may include one or more input devices, such as a keyboard, mouse, camera, touch screen and a microphone, and may also include one or more output devices such as a display screen and a speaker. Marketing system has a network interface in order to communicate with other components, to serve an application and other applications, and perform other computing applications by connecting to network XX (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. There may be multiple marketing systems or groups of marketing systems distributed over a wide geographic area and connected via e.g. network.

The marketing system may generally connect with or includes one or more data storage devices (e.g., memory, and the like), and could include a relational database (such as a SQL database), or other suitable data storage mechanisms. Data storage devices are operable to store data records for marketing system, and associated applications. Marketing system may be a cloud based system with data storage device accessible to components and others systems through a cloud services interface. Cloud computing generally is the use of computing hardware and software resources that are delivered as a service over a network. Data storage devices may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like.
In some embodiments, marketing system may also have one or more backup servers that may duplicate some or all of the data stored on the data storage devices. The backup servers may be desirable for disaster recovery (e.g., to prevent undesired data loss in the event of an event such as a fire, flooding, or theft). In some embodiments, the backup servers may be directly connected to the system 10 but located at a different physical location.

Referring now to FIG. 3b, a process 300b begins at step 330 where contributions are generated in a sub-routine that receives details of a single transaction record as extracted from information pertaining to an authorization response. At step 332 of process 300b, identification may be made of the operating merchant and its geographically located store where each transaction occurred. At step 334, there is retrieval of the contribution rate as may be prescribed by a predetermined business rule for the merchant-store, or other rule specified by a different donor, according to the current time and date of the transaction, optionally also for that geographic location. At step 336, an application may be made of the contribution rate to the transaction amount to determine the contribution amount. At step 338, identification may be made, via the corresponding business rule, of the identity of the charity that may be to receive the contribution based, optionally, on the locality of the merchant and charity. At step 340, a record may be made of the contribution amount with a link to the applicable charity, the merchant's contribution rate record, and the transaction record. Thereafter, process 300b may returns for iterative processing.

Figure 4:
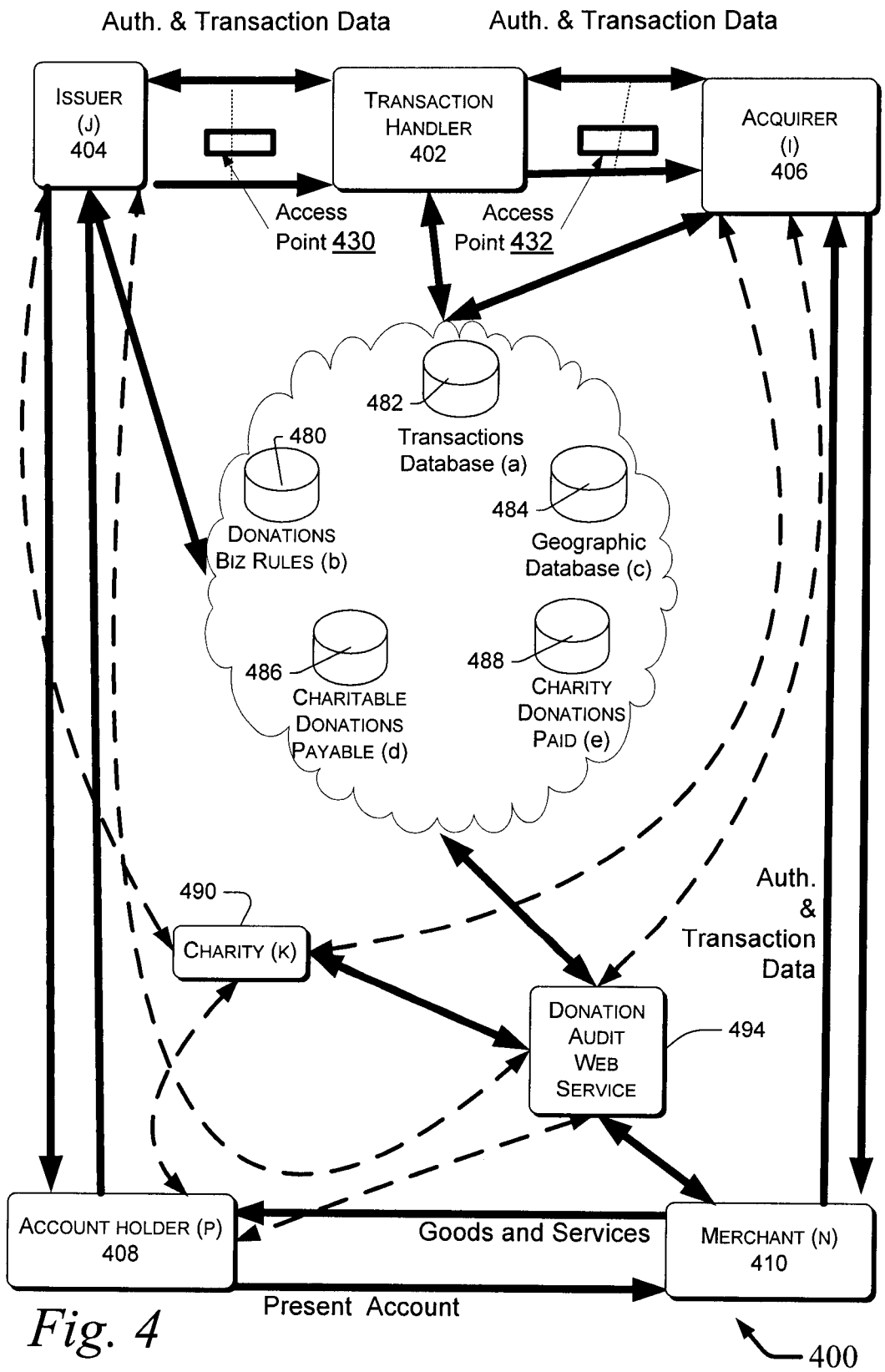
FIG. 4 illustrates an exemplary open loop payments processing system for processing transactions conducted by merchants with physically present consumer account holders, wherein, for each transaction, there is a provision of a service or good by the merchant to the consumer account holder for the transaction on an account issued to the consumer account holder by an issuer, there is an authorizing and remunerating of an electronic payment by the consumer account holder in conducting the transaction on the account with the merchant, and there are one or more charitable contributions made to respective charities incident to the transaction.

Referring now to FIG. 4, there is shown an exemplary process 400 that may be implemented by components of a financial transaction system, such as may be described as an open loop system, in which an account holder (p) 408 conducts a financial transaction with a merchant (m) 410. By way of example, the account holder's (p) 408 financial transaction with the merchant (m) 410 may have been incentivized by the merchant's (m) 410 agreement to make a donation to a charity in the local community as defined by the merchant through an ad incentive.

In FIG. 4, by way of explanation for the nomenclature of reference numerals used and described in the specification, a lower case letter in parenthesis is may refer to an integer variable having a value from 1 to the capital case of the lower case letter, which value may be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 404, 406, 408, 410, 480, 482, 484, 486, and 488 in FIG. 4 may be illustrated with a block, but indicate one or more elements can be present. For example, Issuer (j) 404 is one of a possible plurality of issuers, where j may range from 1 to a large integer. This may also apply to other Figures herein.

Account holder (p) 408 presents an electronic payment device (i.e.; a credit card) to a Merchant (m) 410 as tender for a financial transaction such as a purchase of goods and services. Other financial transactions and instruments other than credit cards may also be used, including, but not limited to, a prepaid card, a gift card, a debit card, a token equivalent of an account as communicated via cellular telephony, near field communications, and the like. For purposes of illustration and explanation, however, reference will be made to a credit card.

As part of the transaction, the Account Holder (p)'s 408 payment device can be a credit card, debit card, prepaid card, cellular telephone, Personal Digital Assistant (PDA), tablet, mobile computing device, etc. The payment device may be read by a reader operated by the Merchant (n) 410, whereupon account information is read from the payment device and a request for authorization is transmitted to the Merchant's (n) 410 Acquirer (i) 406. Each Acquirer (i) 406 is a financial organization that processes credit card transactions for businesses, for example merchants, and is licensed as a member of a transaction handler 402 such as a credit card association (i.e., Visa Inc., MasterCard, etc.) As such, each Acquirer (i) 406 establishes a financial relationship with one or more Merchants (n) 410.

The Acquirer (i) 406 transmits the account information to the Transaction Handler 402, who in turn routes the authorization request to the account holder's issuing bank, or Issuer (j) 404. The Issuer (j) 404 returns information via an authorization response to the Transaction Handler 402 who returns the information to the Merchant (n) 410 through the Acquirer (i) 406. The Merchant (n) 410, now knowing whether the Account Holder's (p) 408 credit card account is valid and supports a sufficient credit balance, may complete the transaction and the Account holder (p) 408 in turn receives goods and/or services in exchange. Most credit card associations instruct merchants that, after receiving an affirmative authorization response, the detailed credit card account information obtained by a point of service terminal (e.g., such as via a magnetic stripe scanner) must be deleted.

To reconcile the financial transactions and provide for remuneration, information about the transaction is provided by the Merchant (n) 410 to Acquirer (i) 406, who in turn routes the transaction data to the Transaction Handler 402 who then provides the transaction data to the appropriate Issuer (j) 404. The Issuer (j) 404 then provides funding for the transaction to the Transaction Handler 402 through a settlement bank. The funds are then forwarded to the Merchant's (n) 410 Acquirer (i) 406 who in turn pays the Merchant (n) 410 for the transaction conducted at step 462 less a merchant discount, if applicable. The Issuer (j) 404 then bills the Account holder (p) 408, and the Account holder (p) 408 pays the Issuer 404 with possible interest or fees.

Also shown in FIG. 4 are one or more charities (k) 490 and a Donation Services Server 494 (referred to in this example as a Donation Audit Web Service 494) that implements processes by which donations to the one or more charities (k) 490 from various donors, such as for instance, any Issuer (j) 404, an Merchant (n) 410, any Acquirer (i) 406, and the Transaction Handler 402.

Each of the Donation Services Server 494, the Issuer (j) 404, the Acquirer (i) 406 and the Transaction Handler 402 may have access to information resources within the following data storage devices storing databases: Transaction Database (a) 482 that stores information about transactions between each Merchant (n) 410 and each Account holder (p) 408, a Donations Business (Biz) Rules Database (b) 480 to store information defining the terms and conditions under which a donor will make donation to a charity (k) 490, a Geographic Database (c) 484 to store information that define the respective communities of the donors on a geographic basis, a Charitable Donations Payable (d) Database 486 to store information about currency amounts of donations that are obligations that are to be paid by specific donors to each charity (k) 490, and a Charitable Donations Paid (d) Database 486 to store information about currency amounts of donations that have been made by donors to each charity (k) 490.

The data storage devices 480-488 (e.g., memory, and the like) may could include a relational database (such as a SQL database), file system, or other suitable data storage mechanisms. Data storage devices 480-488 are operable to store data records for system, and associated applications. Data storage devices 480-488 may be cloud based data storage device and may be accessible through a cloud services interface. Cloud computing generally is the use of computing hardware and software resources that are delivered as a service over a network. Data storage devices 480-488 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like.

In some embodiments, the system 10 may also have one or more backup servers that may duplicate some or all of the data stored on the data storage devices 480-488. The backup servers may be desirable for disaster recovery (e.g., to prevent undesired data loss in the event of an event such as a fire, flooding, or theft). In some embodiments, the backup servers may be directly connected to the system but located at a different physical location.

Databases 480-488 may be connected by one or more private or public networks, virtual private networks, the Internet, or by other means known to those skilled in the art. Moreover, not every entity seen in FIG. 4 must necessarily have access to any or all of the Databases 480-488. Each such Databases 480-488 can assign, read, write, and query permissions, security mechanisms, and authentications as appropriate to the various entities. For example, a Merchant (n) 410 may have read access to the Transactions Database (a) 482 and the Issuer (j) 404 may have read and write access to the Transactions Database (a) 482.

The Transactions Database (a) 482 is designed to store some or all of the transaction data originating at the Merchants (n) 410 that use a payment device for each transaction conducted between an Account holder (p) 408 and the Merchant (n) 410. The transaction data can include information associated with the account of an Account holder (p) 408, date, time, and an identifier sufficient to determine a physical geographic location where the transaction took place, among other more specific information including the amount of the transaction. The database can be searched using account information, date and time (or within proximity thereof), or by any other field stored in the database.

The Transactions Database (a) 482 is also designed to store information about each Merchant (n) 410, where the information can include a unique identification of each Merchant (n) 410, an identifier for each point of sale device in use by the Merchant (n) 410, and a physical geographic location of each store of the Merchant (n) 410.

Also included in the Transactions Database (a) 482 is account information for payment devices associated with Account holder (p) 408, such as part or all of an account number, unique encryption key, account information, and account name of an account holder who is registered to participate in a system in which donations can be made to each charity (k) 490 as per rules stored in Donations Biz Rule Database (b) 480.

After registering to participate in the donation system, an Account holder (p) 408 initiates a qualifying purchase transaction with a Merchant (n) 410 by presenting a payment device to the Merchant (n) 410. The payment device is typically presented at the POS terminal at which data thereon is read. Certain transaction information is transmitted from the POS in route to the Merchant's (n) 410 Acquirer (i) 406. The transaction information may include account information, account name, transaction balance, transaction time, transaction date, and transaction location. Sensitive information includes information such account number and account holder name that identify and associate a particular account with a particular account holder. This transaction information may be transmitted via a less secure communication medium. In addition, a transmission of transaction data may occur with weak or no encryption between two or more points from the point of origin, such as the point of sale device at the Merchant (n) 410, and the ultimate destination, such as the Acquirer (i) 406. These points can include, without limitation, from the reader at the POS, the POS at the Merchant (n) 410 and a network router or computer that is connected to a network but is housed and maintained by the Merchant (n) 410 and between the Merchant (n) 410 and the Acquirer (i) 406. The communication channel could be Ethernet, wireless internet, satellite, infrared transmission, or other known communication protocols. Some or all of the transmission may also be stored for record keeping, archival or data mining purposes with little or no encryption. For example, the Merchant (n) 410 may store transaction data, including certain account information in the Merchant's (n) 410 accounts on file database for reuse later.

In this process, transaction information relating to the qualifying purchase is retrieved from the POS at a Merchant (n) 406. The transaction information may include account information together with other information about the transaction itself: time, date, location, value, etc. Certain of the transaction information are considered sensitive information including, without limitation, account number, credit card verification number, and account name.

Referring now to FIG. 7a, a screen shot 702 of a user interface of a merchant computing device features input and displays fields by which a Merchant (n) 410, or agent thereof, can input terms and conditions under which the Merchant (n) 410 is willing to become legally bound to make a donation to a charity (k) 490. Each row in the screen shot 702 represent all or a portion of twenty-four (24) hour days of the calendar year. Columns in each row of the table seen in screen shot 702 are, from left to right, as follows: 1st the numerical calendar day of the year; 2nd the hyphenated starting and ending of a time period within the calendar day; 4th a percentage of a currency amount of any one (1) transaction that the Merchant (n) 410 will commit to make to a charity (k) 490; 5th the minimum currency amount of the transaction before the commitment by the Merchant (n) 410 to make the donation will arise; 6th maximum amount of donation that the Merchant (n) 410 is willing to make for any one (1) transaction; 7th an identifier for the charity (k) 490 to whom the Merchant (n) 410 is to make the donation as described in the row. These are non-limiting examples.

By way of example, and not by way of limitation, the data input by the Merchant (n) 410, or agent thereof, for display on screen shot 702 may be stored in Donations Biz Rules (b) 480 or other location logically accessible, via one or more networks or otherwise, to Donation Service System 494. These data can also be automatically pre-loaded for Merchant (n) 410 via an automatic initiating service that allows the Merchant (n) 410 to be entered as a participant in a local community charitable donations program through traffic each store location of the Merchant (n) 410 in the local community will be incentivized to increase.

Optionally, screen shot 702 can also be used by other donors seen in FIG. 4, to input and see a display of those fields by which the donor, or agent thereof, can input terms and conditions under which the donor is willing to become legally bound to make a donation to a charity (k) 490. Such other donors include each issuer (j) 404, the transaction handler 402, and the acquirer (i) 406.

Referring now to FIG. 7b, a screen shot 704 features input and displays fields by which an Account Holder (p) 408, or agent thereof, can direct a third party donor, such as a Merchant (n) 410 with whom the Account Holder (p) 408 is conducting a transaction, to become legally bound to make a donation to a charity (k) 490. Each row in screen shot 704 represents a different charity. Other donors so directed by the Account Holder (p) 408's data entry can include each issuer (j) 404, the transaction handler 402, and the acquirer (i) 406. The charity (k) 490 is expressed in each row by an integer indexed in both T and T variables. By way of example, such an indexing system might identify a specific charity (k) 490 by the code 105(064) (q2e), where '105' represents the international charitable organization "United Way", the index '064' represents that organization's affiliated charity within the United States of America, and the index 'q2e' represents the borough of Greenwich Village at the southern portion of the geographical island of Manhattan in the city of New York of the State of New York.

For screen shots 702-704, input and selection of data for each charity can be via a typical user experience including but not limited to keyboard data entry, pull down menus, pictograph optical scanning with a cellular telephony device as read from print or electronic media rendering, etc. Horizontal 718 and vertical 720 panning can be user activated to move that portion of the display being rendered horizontally and vertically, respectively.

Other columns in each row of the table seen in screen shot 704 are, from left to right, as follows: 1st the percentage of the donor's donation that the account holder directs to be donated to the charity identified in the 2nd column; 3rd: a yes or no indication whether the account holder will match the donor's donation to that charity; and the 4th through the 7th columns: the maximum currency amounts that the Account Holder will commit to give to the identified charity for the current year, quarter, month and day, respectively. The bottom of screen shot 704 shown the maximum total of all matching contributions to all charities that the Account Holder (p) 408 is willing to commit for the current year, quarter, month and day, respectively.

In accordance with some examples, to pay the donation to the charities so specified in screen shot 704, the Account Holder's (p) 408 issuer (j) 404 can pay the charity (e) 488 and place a debit in that currency amount on the Account Holder's (p) 408 periodic revolving credit statement. The Account Holder (p) 408, upon receipt of the statement, can thereafter make a total payment to the issuer (j) 404 of the currency amount of the donation that appears as a debit on the statement along with the other credit charges that also appear on the Account Holder's (p) 408 statement.

Both the Account Holder (p) 408 and the donor can change or disable a donation commitment at any time by accessing a server that serves web pages rendering screen shots 702, 704, respectively. Thus, charitable donation commitments can be easily and instantly enabled or disabled using the real time user interface. By way of example, and not by way of limitation, such servers can be hosted by the Donation Service Server 494 seen in FIG. 4.

Donation Service Server 494 may be implemented using a server and data storage devices configured with database(s) or file system(s), or using multiple servers or groups of servers distributed over a wide geographic area and connected via a network. Donation Service Server 494 may be connected to a data storage device directly or via to a cloud based data storage device via network. Donation Service Server 494 may reside on any networked computing device including a processor and memory, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these. System 10 may include one or more microprocessors that may be any type of processor, such as, for example, any type of general-purpose microprocessor or microcontroller, a digital signal processing (DSP) processor, an integrated circuit, a programmable read-only memory (PROM), or any combination thereof. Donation Service Server 494 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. Donation Service Server 494 may include one or more input devices, such as a keyboard, mouse, camera, touch screen and a microphone, and may also include one or more output devices such as a display screen and a speaker. Donation Service Server 494 has a network interface in order to communicate with other components, to serve an application and other applications, and perform other computing applications by connecting to network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although only one Donation Service Server 494 is shown for clarity, there may be multiple Donation Service Servers 494 or groups of Donation Service Servers 494 distributed over a wide geographic area and connected via e.g. network.

FIG. 4 provides further illustrations are seen of a telecommunications network that may make use of any suitable telecommunications network and may involve different hardware, different software and/or different protocols then those discussed herein. FIG. 4 may provide a global telecommunications network that supports purchase and cash transactions using any bankcard, travel and entertainment cards, and other private label and proprietary cards. The network also supports ATM transactions for other networks, transactions using paper checks, transactions using smart cards and transactions using other financial instruments. These transactions are processed through the network's authorization, clearing and settlement services. Authorization occurs when an issuer approves or declines a sales transaction before a purchase is finalized or cash is dispersed. Clearing occurs when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice the first time with only information needed for an authorization decision, an again later with additional information for clearing and settlement. A single message transaction is sent once for authorization and contains clearing and settlement information as well. Typically, authorization, clearing and settlement all occur on-line.

FIG. 4 includes access points 430, 432 between transaction handler 402 and each Acquirer (i) 406 and issuer (j) 404. Other entities such as drawee banks and third party authorizing agents may also connect to the financial network through an access point (not shown). An interchange center has systems, such as those shown in FIG. 5 at reference numeral 540, so as to be a data processing center that may be located anywhere in the world. Each interchange center may house a computer system that performs the network transaction processing. The interchange center serves as the control point for the telecommunication facilities of the network, which comprises high-speed leased lines or satellite connections, for instance as may be based on IBM SNA protocol. The communication lines that connect an interchange center (Transaction Handler 402) to remote entities may use dedicated high-bandwidth telephone circuits or satellite connections, for instance as may be based on the IBM SNA-LUO communication protocol. Messages are sent over these lines using any suitable implementation of the ISO 8583 standard, or other financial standard as may be applicable.

Access points 430, 432 are typically made up of small computer systems located at a processing center that interfaces between the center's host computer and the interchange center system 540. The access point facilitates the transmission of messages and files between the host and the interchange center supporting the authorization, clearing and settlement of transaction. Telecommunication links between the acquirer (i) 496 and its access point 432, and between the access point 430 and issuer (j) 404 are typically local links within a center and use a proprietary message format as preferred by the center.

A data processing center (such as may be located within an acquirer, issuer, or other entity) houses processing systems that support merchant and business locations and maintains customer data and billing systems. Each processing center may be linked to one or two interchange centers. Processors are connected to the closest interchange, and if the network experiences interruptions, the network automatically routes transactions to a secondary interchange center. Each interchange center may also linked to all of the other interchange centers. This linking enables processing centers to communicate with each other through one or more interchange centers. In addition, processing centers may access the networks of other programs through the interchange center. Further, the network ensures that all links have multiple backups. The connection from one point of the network to another may not usually be a fixed link; instead, the interchange center may choose the best possible path at the time of any given transmission. Rerouting around any faulty link occurs automatically.

FIG. 5 illustrates interchange center systems 540 housed within an interchange center to provide on-line and off-line transaction processing. For dual message transaction, authorization system 542 provides authorization. Authorization system 542 supports on-line and off-line functions, and its file includes internal systems tables, a customer database and a merchant central file. The on-line functions of system 542 support dual message authorization processing. This processing involves routing, account holder and card verification and stand-in processing, and other functions such as file maintenance. Reporting includes authorization reports, exception file and advice file reports, POS reports and billing reports. A bridge from system 542 to a Single Message System (SMS) 546 may make it possible for issuers and acquirers to use system 542 to communicate with other issuers and acquirers using system 546 and access the SMS gateways to outside networks.

Clearing and settlement system 544 clears and settles previously authorized dual message transactions. System 544 collects financial and non-financial information and distributes reports between members. It also calculates fees, charges and settlement totals and produces reports to help with reconciliation. A bridge forms an interchange between clearing and settlement system 544 processing centers and system 548 processing centers.

Single message system 546 processes full financial transactions and can also process dual message authorization and clearing transactions, as well as communicate with authorization system 542 using a bridge and accesses outside networks as required. Single message system 546 processes cashless issued account-based acquired transactions, for instance Visa, Plus, Interlink. Maestro, Cirrus, and others.

By way of example, SMS files comprise internal system tables that control system access and processing, and an account holder database, which contains files of account holder data used for Personal IDentifier (PIN) verification and stand-in processing authorization. Single message system 546 has on-line functions that perform real-time account holder transaction processing and exception processing for authorization as well as full financial transactions. Single message system 546 also accumulates reconciliation and settlement totals. Single message system 546 also has off-line functions that process settlement and funds transfer requests and provide settlement and activities reporting. Settlement service 548 consolidates the settlement functions of clearing and settlement system 544 and single message system 546 for cashless issued account-based acquired transactions into a single service for all products and services. Clearing continues to be performed separately by clearing and settlement system 544 and single message system 546.

Figure 6:
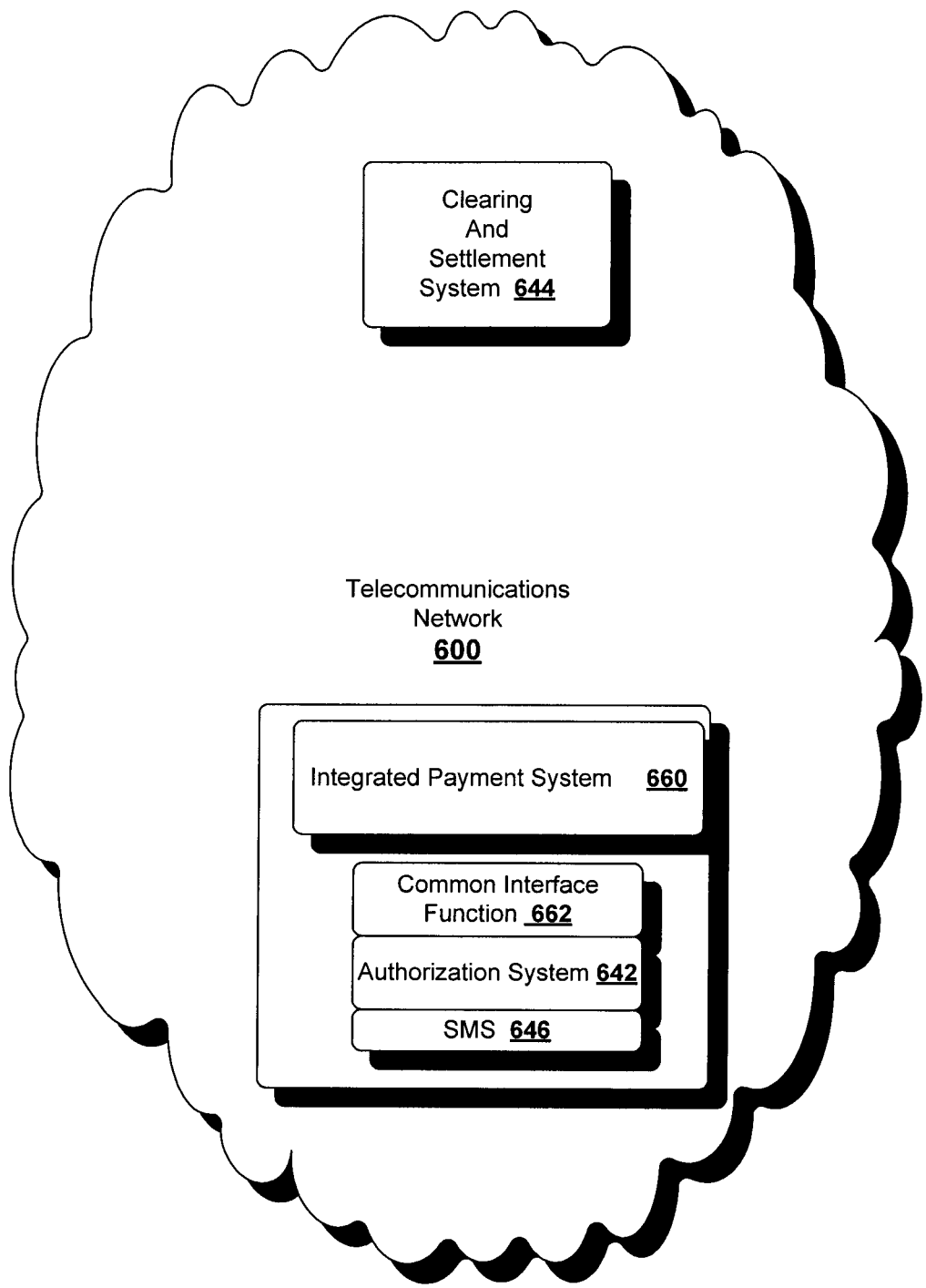
FIG. 6 illustrates further exemplary details of the systems illustrated in FIG. 5.

FIG. 6 illustrates another view of components of FIG. 5 in a telecommunications network 600. Integrated payment system 660 may be the primary system for processing all on-line authorization and financial request transactions. System 660 reports both dual message and single message processing. In both cases, settlement may occur separately. The three main software components are the common interface function 662, authorization system 642 and single message system 646.

Common interface function 662 is operable to determine the processing required for each message received at an interchange center. It chooses the appropriate routing, based on the source of the message (system 642, 644 or 646), the type of processing request and the processing network. This component performs initial message editing, and, when necessary, parses the message and ensures that the content complies with basic message construction rules. Common interface function 662 routes messages to their system 642 or system 646 destinations.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, there may be other ways and/or methods for various implements. Moreover, it is understood that a functional step of described methods or processes, and combinations thereof can be implemented by computer program instructions that, when executed by a processor, create means for implementing the functional steps. The instructions may be included in non-transitory computer readable medium that can be loaded onto a general-purpose computer, a special purpose computer, or other programmable apparatus.

It is understood that the examples and implementations described herein are for illustrative purposes only and that various modifications or changes in light thereof are to be included within the spirit and purview of this application and scope of the appended claims.

The invention claimed is:

1. A method comprising a plurality of steps, wherein the steps include for each transaction with a merchant that is conducted on an account issued to a consumer account holder:
 receiving information for the transaction derived from:
  interchange data for setting an interchange rate for the transaction on the account of the consumer account holder;
  at least one of an authorization request for the transaction;
  an authorization response for the transaction; and
  a geolocation of a brick and mortar store of the merchant at which the transaction was conducted;
 geolocating a web-enabled mobile computing device that:
  has a wireless communication technology to wirelessly communicate information stored therein; and
  stores an identifier for the account on which the transaction was conducted;
 ascertaining that a physical card bearing the account of the consumer account holder was physically present when the transaction was conducted by using:
  an Authorization Transaction Code included in the at least one of an authorization request for the transaction and indicating that the transaction was not a Card Not Present (CNP) transaction;
  the interchange data for setting an interchange rate for the transaction on the account of the consumer account holder;
  and
  the wireless communications with the web-enabled mobile computing device;
 and
 for each said ascertained web-enabled mobile computing device:
  receiving information derived from the authorization response for the transaction and including the date and the time, a currency amount, and an identifier for the merchant;
  for each said transaction for which the date and time of the corresponding said authorization response are within a predetermined time period:
   for each said identifier for the merchant:
    deriving the sum of the currency amounts;
    using the identifier for the merchant to access a database to retrieve:
     the logical address for the merchant corresponding to the identifier for the merchant; and
     a business rule for making a donation corresponding to an identifier for a charity having a logical address, wherein in the donation is a function, at least in part, of the sum of the currency amounts;
    deriving, using the business rule and the sum of the currency amounts, the donation;
    and
    transmitting, to the logical address for the merchant, the donation to the charity for the predetermined time period;
  and
  within a predetermined audit time period for and after the predetermined time period:
   receiving a plurality of donation receipts each including:
    the respective identifiers for the charity and the merchant; and
    a currency amount;
   and
   for each said identifier for the merchant, deriving the sum of the currency amounts of the donation receipts for each said identifier for the charity.

2. The method as defined in claim 1, wherein the received information further comprises data indicative that the identifier for the account was electronically read from the web-enabled mobile computing device by a reader co-located with the merchant.

3. The method as defined in claim 2, wherein the reader is selected from the group consisting of a Near Field Communication (NFC) reader, a contactless payment card reader, and a wireless communication reader.

4. The method as defined in claim 1, wherein the steps further comprise:
   receiving an identifier for the consumer account holder, wherein the identifier is derived from the authorization request;
   determining, using the identifier for the consumer account holder, a geographic location for the consumer account holder, wherein the geographic location is within a predetermined geographical community; and
   selecting the charity from a plurality of potential charities, wherein the charity services the predetermined geographical community.

5. The method as defined in claim 1, wherein the received information further comprises a card verification value.

6. The method as defined in claim 1, wherein the received information further comprises data indicative that the signature identification was used for cardholder identification data.

7. The method as defined in claim 1, wherein the received information further comprises a Personal Identification Number (PIN).

8. The method as defined in claim 1, wherein the received information further comprises address verification information for the consumer account holder.

9. The method as defined in 1, wherein the steps further comprise:
   after the predetermined audit time period for the predetermined time:
      for each said identifier for the merchant:
         for each said identifier corresponding to each said charity to whom a donation was to be made as per the retrieved business rule:
            determining a difference between:
               the donation for the predetermined time period that was transmitted to the logical address for the merchant; and
               the sum of the currency amounts of the donation receipts received for the charity for the predetermined time period;
            and
            transmitting the determined difference to the logical address for the merchant.

10. A non-transient computer readable medium comprising software instructions executed by hardware to perform the steps of the method as defined in claim 1.

11. In a system including a plurality of merchants conducting transactions on respective accounts issued to respective consumer account holders by respective issuers, wherein each transaction on each said account is acquired for clearing and settlement by an acquirer for the merchant through a transaction handler in communication with both the issuer of the account and the acquirer for the merchant, and wherein the issuer sends an authorization response for the transaction to the merchant through the transaction handler and the acquirer in response to an authorization request sent to the issuer from the merchant through the transaction handler and the acquirer, a method comprising a plurality of steps, wherein the steps for each transaction with a merchant that is conducted on an account issued to a consumer account holder:

receiving information for the transaction derived from:
   interchange data for setting an interchange rate for the transaction on the account of the consumer account holder;
   at least one of an authorization request for the transaction;
   an authorization response for the transaction; and
   a geolocation of a brick and mortar store of the merchant at which the transaction was conducted;
geolocating a web-enabled mobile computing device that:
   has a wireless communication technology to wirelessly communicate information stored therein; and
   stores an identifier for the account on which the transaction was conducted;
ascertaining that a physical card bearing the account of the consumer account holder was physically present when the transaction was conducted by using:
   information derived from the at least one of an authorization request for the transaction which derived said information indicates that a physical card bearing the account of the consumer account holder was physically present at the time of the transaction;
   the interchange data for setting an interchange rate for the transaction on the account of the consumer account holder;
   and
   the wireless communications with the web-enabled mobile computing device;
and
for each said ascertained web-enabled mobile computing device:
   receiving information derived from the authorization response for the transaction and including the date and the time, a currency amount, and an identifier for the merchant;
   for each said transaction for which the date and time of the corresponding said authorization response are within a predetermined time period:
      using the identifier for the merchant to access a database to retrieve a geographic location of the merchant corresponding to the identifier for the merchant; and
      for each said transaction for which the geographic location of the merchant corresponding to the identifier for the merchant is within a predetermined geographically designated community:
         for each said identifier for the merchant:
         deriving the sum of the currency amounts;
         using the identifier for the merchant to access a database to retrieve:
            the logical address for the merchant corresponding to the identifier for the merchant;
            a business rule for making a donation corresponding to an identifier for a charity within the predetermined geographically designated community and having a logical address, wherein in the donation is a function, at least in part, of the sum of the currency amounts;
         deriving, using the business rule and the sum of the currency amounts, the donation;
         and
         transmitting, to the logical address for the merchant, the donation to the charity within the predetermined geographically designated community for the predetermined time period;
      and within a predetermined audit time period for and after the predetermined time period:
receiving a plurality of donation receipts each including:
the respective identifiers for the charity within the predetermined geographically designated community of the merchant; and
a currency amount; and
for each said identifier for the merchant, deriving the sum of the currency amounts of the donation receipts corresponding to each said charity within the predetermined geographically designated community.

12. The method as defined in claim 11, wherein the steps further comprise:
after the predetermined audit time period for the predetermined time period:
for each said identifier for the merchant:
for each said identifier corresponding to each said charity within the predetermined geographically designated community to whom a donation was to be made as per the retrieved business rule:
determining a difference between:
the donation for the predetermined time period that was transmitted to the logical address for the merchant; and
the sum of the currency amounts of the donation receipts received for the charity within the predetermined geographically designated community for the predetermined time period;
and
transmitting the determined difference to the logical address for the merchant.

13. In a system including a plurality of merchants conducting transactions on respective accounts issued to respective consumer account holders by respective issuers, wherein each transaction on each said account is acquired for clearing and settlement by an acquirer for the merchant through a transaction handler in communication with both the issuer of the account and the acquirer for the merchant, and wherein the issuer sends an authorization response for the transaction to the merchant through the transaction handler and the acquirer in response to an authorization request sent to the issuer from the merchant through the transaction handler and the acquirer, a method comprising a plurality of steps, wherein the steps for each transaction with a merchant that is conducted on an account issued to a consumer account holder:
receiving information for the transaction derived from:
interchange data for setting an interchange rate for the transaction on the account of the consumer account holder
at least one of an authorization request for the transaction;
an authorization response for the transaction; and
a geolocation of a brick and mortar store of the merchant at which the transaction was conducted;
geolocating a web-enabled mobile computing device that:
has a wireless communication technology to wirelessly communicate information stored therein; and
stores an identifier for the account on which the transaction was conducted;
ascertaining that a physical card bearing the account of the consumer account holder was physically present when the transaction was conducted by using:
information derived from the at least one of an authorization request for the transaction indicating that the transaction was not a Card Not Present (CNP) transaction;
the interchange data for setting an interchange rate for the transaction on the account of the consumer account holder;
and
the wireless communications with the web-enabled mobile computing device;
and
for each said ascertained web-enabled mobile computing device:
receiving information derived from the authorization response for the transaction and including the date and the time, a currency amount, identifiers for the merchant and the consumer account holder;
for each said transaction for which the date and time of the corresponding said authorization response are within a predetermined time period:
using the identifier for the merchant to access a database to retrieve a geographic location of the merchant corresponding to the identifier for the merchant; and
for each said transaction for which the geographic location of the merchant corresponding to the identifier for the merchant is within a predetermined geographically designated community:
for each said identifier for the merchant:
deriving the sum of the currency amounts;
using the identifier for the merchant to access a database to retrieve:
the logical address for the merchant corresponding to the identifier for the merchant;
a business rule for making a donation within the predetermined geographically designated community that is a function, at least in part, of the sum of the currency amounts;
using the identifier for the consumer account holder to access a database to retrieve a business rule for making a donation corresponding to one or more identifiers for one or more charities within the predetermined geographically designated community, each said charity having a logical address;
deriving, using the sum of the currency amounts and the retrieved business rules for the merchant and the consumer account holder, the respective donation corresponding to the one or more identifiers for one or more charities; and
transmitting, to a logical address for the merchant, the respective donation corresponding to the one or more identifiers for one or more charities within the predetermined geographically designated community for the predetermined time period;
and
within a predetermined audit time period for and after the predetermined time period:
receiving a plurality of donation receipts each including:
the respective identifiers for the charity within the predetermined geographically designated community of the merchant; and
a currency amount; and
for each said identifier for the merchant, deriving the sum of the currency amounts of the donation receipts corresponding to each said charity within the predetermined geographically designated community.

14. The method as defined in claim 13, wherein the steps further comprise:
after the predetermined audit time period for the predetermined time period:
for each said identifier of the merchant:
for each said identifier of the charity within the predetermined geographically designated community to whom a donation was to be made:
determining a difference between:
the donations for the predetermined time period that were transmitted to the logical address for the merchant; and
the sum of the currency amounts of the donation receipts received for the charity for the predetermined time period for the merchant;
and
transmitting the determined difference to the logical address for the merchant.

15. In a system including a plurality of merchants conducting transactions on respective accounts issued to respective consumer account holders by respective issuers, wherein each transaction on each said account is acquired for clearing and settlement by an acquirer for the merchant through a transaction handler in communication with both the issuer of the account and the acquirer for the merchant, and wherein the issuer sends an authorization response for the transaction to the merchant through the transaction handler and the acquirer in response to an authorization request sent to the issuer from the merchant through the transaction handler and the acquirer, a method comprising a plurality of steps, wherein the steps include for each transaction with a merchant that is conducted on an account issued to a consumer account holder:
receiving information for the transaction derived from:
interchange data for setting an interchange rate for the transaction on the account of the consumer account holder;
at least one of an authorization request for the transaction;
an authorization response for the transaction; and
a geolocation of a brick and mortar store of the merchant at which the transaction was conducted;
geolocating a web-enabled mobile computing device that:
has a wireless communication technology to wirelessly communicate information stored therein; and
stores an identifier for the account on which the transaction was conducted;
ascertaining that a physical card bearing the account of the consumer account holder was physically present when the transaction was conducted by using:
a field containing information that is included in the at least one of an authorization request for the transaction which field indicates that the transaction was not a Card Not Present (CNP) transaction;
the interchange data for setting an interchange rate for the transaction on the account of the consumer account holder;
and
the wireless communications with the web-enabled mobile computing device;
and
for each said ascertained web-enabled mobile computing device:
receiving information derived from the authorization response for the transaction and including the date and the time, a currency amount, identifiers for the merchant and the consumer account holder;
for each said transaction for which the date and time of the corresponding said authorization response are within a predetermined time period:
using the identifier for the merchant to access a database to retrieve a geographic location of the merchant corresponding to the identifier for the merchant; and
for each said transaction for which the geographic location of the merchant corresponding to the identifier for the merchant is within a predetermined geographically designated community:
for each said identifier for the merchant:
deriving the sum of the currency amounts;
using the identifier for the merchant to access a database to retrieve:
the logical address for the merchant corresponding to the identifier for the merchant;
a business rule for both the merchant and the acquirer for the merchant making respective donations within the predetermined geographically designated community, where the respective donations are each a function, at least in part, of the sum of the currency amounts;
using the identifier for the consumer account holder to access a database to retrieve a business rule for making a donation corresponding to one or more identifiers for one or more charities within the predetermined geographically designated community, each said charity having a logical address;
deriving, using the sum of the currency amounts and the retrieved business rules for the merchant, the acquirer for the merchant, and the consumer account holder, the respective donation corresponding to the one or more identifiers for one or more charities; and
transmitting, to the respective logical addresses for the merchant and the acquirer for the merchant:
the identifier for the merchant; and
the respective donations, of both the merchant and the acquirer for the merchant, corresponding to the one or more identifiers for one or more charities within the predetermined geographically designated community for the predetermined time period;
and
within a predetermined audit time period for and after the predetermined time period:
receiving a plurality of donation receipts each including:
the respective identifiers for:
the charity within the predetermined geographically designated community;
the acquirer for the merchant; and
the merchant; and
a currency amount;
for each said identifier for the merchant, deriving the sum of the currency amounts of the donation receipts corresponding to each said charity within the predetermined geographically designated community; and
for each said identifier for the acquirer for the merchant, deriving the sum of the currency amounts of the donation receipts corresponding to each said charity within the predetermined geographically designated community.

16. The method as defined in claim 15, wherein the steps further comprise:
after the predetermined audit time period for the predetermined time period:
for each said logical address for the acquirer for the merchant:
for each said identifier of the charity within the predetermined geographically designated community to whom a donation was to be made:
determining a difference between:
the donations for the predetermined time period that were transmitted to the logical address for the merchant; and
the sum of the currency amounts of the donation receipts received for the charity for the predetermined time period for the merchant; and
transmitting the determined difference to the logical address for the merchant;
and
for each said logical address for the acquirer for the merchant:
for each said identifier of the charity within the predetermined geographically designated community to whom a donation was to be made:
determining a difference between:
the donations for the predetermined time period that were transmitted to the logical address of the acquirer for the merchant; and
the sum of the currency amounts of the donation receipts received for the charity for the predetermined time period for the merchants corresponding to the acquirer for the merchant;
and
transmitting the determined difference to the logical address for the acquirer for the merchant.

17. The method as defined in claim 15, wherein:
each said transaction is conducted upon an account issued by the issuer to the consumer account holder in which the acquirer for the merchant assesses the merchant a fee for the transaction, wherein the type of the account issued by the issuer to the consumer account holder is selected from the group consisting of a revolving credit account, a debit account, a charge account, an Automatic Teller Machine (ATM) account, a prepaid account, and a gift account; and
the business rule for both the merchant and the acquirer for the merchant making respective donations within the predetermined geographically designated community are each a function, at least in part, of:
the sum of the currency amounts; and
the fee assessed by the acquirer for the merchant to the merchant for the transaction.

18. In a system including a plurality of merchants conducting transactions on respective accounts issued to respective consumer account holders by respective issuers, wherein each transaction on each said account is acquired for clearing and settlement by an acquirer for the merchant through a transaction handler in communication with both the issuer of the account and the acquirer for the merchant, and wherein the issuer sends an authorization response for the transaction to the merchant through the transaction handler and the acquirer in response to an authorization request sent to the issuer from the merchant through the transaction handler and the acquirer for the merchant, a method comprising a plurality of steps, wherein the steps include for each transaction with a merchant that is conducted on an account issued to a consumer account holder:
receiving information for the transaction derived from:
interchange data for setting an interchange rate for the transaction on the account of the consumer account holder;
at least one of an authorization request for the transaction;
an authorization response for the transaction; and
a geolocation of a brick and mortar store of the merchant at which the transaction was conducted;
geolocating a web-enabled mobile computing device that:
has a wireless communication technology to wirelessly communicate information stored therein; and
stores an identifier for the account on which the transaction was conducted;
ascertaining that a physical card bearing the account of the consumer account holder was physically present when the transaction was conducted by using:
data in the at least one of an authorization request for the transaction indicating that the transaction was not a Card Not Present (CNP) transaction;
the interchange data for setting an interchange rate for the transaction on the account of the consumer account holder;
and
the wireless communications with the web-enabled mobile computing device;
and
for each said ascertained web-enabled mobile computing device:
receiving information derived from the authorization response for the transaction and including the date and the time, a currency amount, identifiers for the merchant and the consumer account holder;
for each said transaction for which the date and time of the corresponding said authorization response are within a predetermined time period:
for each said identifier for the merchant:
deriving the sum of the currency amounts;
using the identifier for the merchant to access a database to retrieve:
the logical address for the merchant corresponding to the identifier for the merchant;
a business rule for making a donation that is a function, at least in part, of the sum of the currency amounts;
using the identifier for the consumer account holder to access a database to retrieve a business rule for both the merchant and the consumer account holder making respective donations corresponding to one or more identifiers for one or more charities, each said charity having a logical address;
deriving, using the sum of the currency amounts and the retrieved business rules for both the merchant and the consumer account holder, the respective donation corresponding to the one or more identifiers for one or more charities for both the merchant and the consumer account holder; and
transmitting, to the logical address for the acquirer for the merchant:
the identifier for the merchant; and the respective derived donation corresponding to the one or more identifiers for one or more charities for the predetermined time period; and transmitting, to the logical address for the issuer for the consumer account holder:
the identifier for the consumer account holder; and
the respective derived donation corresponding to the one or more identifiers for one or more charities for the predetermined time period;

and within a predetermined audit time period for and after the predetermined time period:
receiving a plurality of donation receipts each including:
a currency amount;
the identifier for the charity; and
a donor identifier selected from a group consisting of:
the identifier for the merchant; and
the identifier for the consumer account holder; and
for each said identifier for the merchant, deriving the sum of the currency amounts of the donation receipts; and
for each said identifier for the consumer account holder, deriving the sum of the currency amounts of the donation receipts.

19. The method as defined in claim 18, wherein the steps further comprise:
after the predetermined audit time period for the predetermined time period:
for each said logical address for the acquirer for the merchant:
for each of the one or more identifiers for one or more charities to whom a donation was to be made:
determining a difference between:
the donations for the predetermined time period that were transmitted to the logical address for the acquirer for the merchant; and
the sum of the currency amounts of the donation receipts received for the charity for the predetermined time period for the merchant corresponding to the acquirer; and
transmitting the determined difference to the logical address for the acquirer for the merchant;

and for each said logical address for the issuer:
for each of the one or more identifiers for one or more charities to whom a donation was to be made:
determining a difference between:
the donations for the predetermined time period that were transmitted to the logical address for the issuer; and
the sum of the currency amounts of the donation receipts received for the charity for the predetermined time period for the account holders corresponding to the issuer; and
transmitting the determined difference to the logical address for the issuer.

20. The method as defined in claim 18, wherein:
each said transaction is conducted upon an account issued by the issuer to the consumer account holder in which the acquirer for the merchant assesses the merchant a fee for the transaction;
the type of the account issued by the issuer to the consumer account holder is selected from the group consisting of a revolving credit account, a debit account, a charge account, an Automatic Teller Machine (ATM) account, a prepaid account, and a gift account;
the business rule for both the merchant and the acquirer for the merchant making respective donations within the predetermined geographically designated community are each a function, at least in part, of:
the sum of the currency amounts; and
the fee assessed by the acquirer for the merchant to the merchant for the transaction.

21. A non-transient computer readable medium comprising software instructions executed by hardware to perform each said step of said plurality of the steps of the method as defined in claim 18.

* * * * *